US012755233B2

(12) United States Patent
Matsumoto et al.

(10) Patent No.: US 12,755,233 B2
(45) Date of Patent: Oct. 6, 2026

(54) ORDER PROCESSING SYSTEM, ORDER PROCESSING METHOD, AND ORDER RECEPTION TERMINAL

(71) Applicant: Rakuten Group, Inc., Tokyo (JP)

(72) Inventors: Asaki Matsumoto, Tokyo (JP); Takayoshi Inuma, Tokyo (JP); Masato Tani, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 293 days.

(21) Appl. No.: 18/467,491

(22) Filed: Sep. 14, 2023

(65) Prior Publication Data

US 2024/0104634 A1 Mar. 28, 2024

(30) Foreign Application Priority Data

Sep. 27, 2022 (JP) ................................ 2022-153897

(51) Int. Cl.
*G06Q 10/083* (2024.01)
*G06Q 30/0283* (2023.01)
*G06Q 30/0601* (2023.01)

(52) U.S. Cl.
CPC ....... *G06Q 10/083* (2013.01); *G06Q 30/0283* (2013.01); *G06Q 30/0633* (2013.01)

(58) Field of Classification Search
None
See application file for complete search history.

(56) References Cited

U.S. PATENT DOCUMENTS

| | | | | |
|---|---|---|---|---|
| 2010/0114790 | A1* | 5/2010 | Strimling | G06Q 10/083 705/330 |
| 2011/0145030 | A1* | 6/2011 | Allen | G06Q 30/02 705/28 |
| 2016/0364678 | A1* | 12/2016 | Cao | G06Q 10/083 |
| 2018/0342169 | A1* | 11/2018 | Gordon | G06Q 30/0635 |
| 2019/0270204 | A1 | 9/2019 | Kawamura et al. | |
| 2020/0401994 | A1* | 12/2020 | Kartoun | G06Q 10/0832 |
| 2021/0109551 | A1* | 4/2021 | Takizawa | G05D 1/106 |
| 2022/0274258 | A1 | 9/2022 | Kawamura et al. | |

FOREIGN PATENT DOCUMENTS

| | | |
|---|---|---|
| JP | 2005-18210 A | 1/2005 |
| JP | 2018-525756 A | 9/2018 |
| JP | 2019-153070 A | 9/2019 |

* cited by examiner

*Primary Examiner* — George Chen
(74) *Attorney, Agent, or Firm* — Sughrue Mion, PLLC

(57) ABSTRACT

The order processing system S receives the designation of the number of ordering users related to the group order, receives the selection of items related to the order, sorts the selected items for each of as many users as the designated number of the users, and performs settlement for the sorted items.

19 Claims, 23 Drawing Sheets

NUMBER-OF-ORDERING-PERSONS DESIGNATION SCREEN

ORDER PROCESSING (2) OF
ORDER RECEPTION & PROCESSING TERMINAL 1
(Example 3)

ORDER PROCESSING SYSTEM, ORDER PROCESSING METHOD, AND ORDER RECEPTION TERMINAL

CROSS REFERENCE TO RELATED APPLICATION

This application claims priority from Japanese Patent Application No. 2022-153897 which was filed on Sep. 27, 2022, the disclosure of which is herein incorporated by reference in its entirety.

TECHNICAL FIELD

One or more embodiments of the present invention relates to a field of a system or the like in which a plurality of persons can simultaneously order items from a terminal.

RELATED ART

In recent years, a system for delivering an item to a delivery destination by means of a delivery vehicle such as a drone and a self-driving vehicle is known. For example, JP 2018-525756 A discloses a system in which a user (recipient) orders a product and makes payment using a mobile device, so that a package enclosing the item is loaded on a drone and delivered to the user.

In a delivery vehicle whose loading capacity is highly restricted having a large restriction on a loading capacity as represented by drone delivery, it is desirable to load items ordered by a plurality of persons together onto one delivery vehicle and deliver the items for the purpose of, for example, increasing delivery efficiency per delivery. As a method in which a plurality of persons simultaneously place orders, for example, it is conceivable that a representative of the plurality of persons collectively places orders of the respective persons at one time using a mobile device terminal. However, in this case, the representative temporarily bears the payment amount (for example, the item price and the delivery fee) for the order of the item ordered by a person other than the representative, and it becomes complicated for each of the persons to grasp the payment amount related to the order and make payment (adjust an account).

Therefore, one or more embodiments of the present invention are to providing an order processing system, an order processing method, and an order reception terminal which, in a case where a plurality of persons simultaneously order items, enable the respective persons to easily grasp the payment amount related to the order and easily make payment.

SUMMARY (An aspect 1) In response to the above issue, an order processing system is configured to be able to, regarding an order of one or more items to be delivered by a movable body, collectively receive the respective orders of a plurality of users, and the order processing system includes: at least one memory configured to store program code; and at least one processor configured to access the program code and operate as instructed by the program code. The program code includes: first reception code configured to cause the at least one processor to receive designation of the number of the users related to the order; second reception code configured to cause the at least one processor to receive selection of the items related to the order; and processing code configured to cause the at least one processor to, for each of as many users as the designated number of the users, sort the selected items and perform settlement for the sorted items.

(An aspect 2) The program code may further include third reception code configured to cause the at least one processor to receive an instruction for sorting the items related to the order. The processing code may be further configured to cause the at least one processor to, for each of as many users as the designated number of the users, sort the selected items instructed for sorting and perform settlement for the sorted items.

(An aspect 3) The processing code may be further configured to cause the at least one processor to display a screen for placing an order of the one or more items sorted for each of the users, the screen being displayed as many times as the designated number of the users, as many times as the designated number of the users. The program code may further include fourth reception code configured to cause the at least one processor to receive the order on each of the screens. The processing code may be further configured to cause the at least one processor to, for each of the received orders, perform settlement for the one or more items sorted for each of the users.

(An aspect 4) The processing code may be further configured to cause the at least one processor to perform settlement for the one or more items sorted for each of the users on the basis of a payment amount related to the order of the one or more items sorted for each of the users.

(An aspect 5) The payment amount may include a price of the one or more items sorted for each of the users and a delivery fee allocated to each of the users.

(An aspect 6) The program code may further include allocation code configured to cause the at least one processor to equally divide a delivery fee required per delivery by the designated number of users and allocate the equally divided delivery fee to each of the users.

(An aspect 7) The program code may further include allocation code configured to cause the at least one processor to allocate different delivery fees for the plurality of users to the respective users on the basis of order contents of the respective users.

(An aspect 8) The allocation code may be further configured to cause the at least one processor to allocate a higher delivery fee to a user with a higher total price of the one or more items related to the order.

(An aspect 9) The allocation code may be further configured to cause the at least one processor to allocate a higher delivery fee to a user with a larger quantity of the one or more items related to the order.

(An aspect 10) The allocation code may be further configured to cause the at least one processor to allocate a higher delivery fee to a user with a higher total weight of the one or more items related to the order.

(An aspect 11) The allocation code may be further configured to cause the at least one processor to allocate a higher delivery fee to a user with a higher total volume of the one or more items related to the order.

(An aspect 12) In a case where a first user in which a total weight of the one or more items sorted for each of the users does not exceed an upper limit value of a weight of one or more items orderable per person and a second user in which a total weight of the one or more items sorted for each of the users exceeds the upper limit value are included in the plurality of users, the program code may further include allocation code configured to cause the at least one processor to allocate a first delivery fee that is a part of a delivery fee required for each delivery to the first user and allocate a second delivery fee that is a part of the delivery fee required for each delivery and higher than the first delivery fee to the second user.

(An aspect 13) In a case where a first user in which a total volume of the one or more items sorted for each of the users does not exceed an upper limit value of a volume of one or more items orderable per person and a second user in which a total volume of the one or more items sorted for each of the users exceeds the upper limit value are included in the plurality of users, the program code may further include allocation code configured to cause the at least one processor to allocate a first delivery fee that is a part of a delivery fee required for each delivery to the first user and allocate a second delivery fee that is a part of the delivery fee required for each delivery and higher than the first delivery fee to the second user.

(An aspect 14) The order processing system may include a server connected to a communication network, and including the at least one memory and the at least one processor. The program code may include: fifth reception code configured to cause the at least one processor to receive, from a first terminal used for the designation of the number of the users and the selection of the one or more items, via the communication network, a first order with a place where the first terminal is installed or a neighborhood thereof as a delivery destination of the one or more items, sixth reception code configured to cause the at least one processor to receive, from a second terminal used for the selection of the one or more items by a user other than the plurality of users, via the communication network, a second order with a delivery destination designated on the second terminal, and determination code configured to cause the at least one processor to determine a delivery plan of the one or more items related to the first order such that the delivery plan is implemented in preference to a delivery plan of the one or more items related to the second order.

(An aspect 15) The determination code may be further configured to cause the at least one processor to determine the delivery plan by selecting the movable body from a plurality of movable bodies and setting at least a scheduled delivery start time and a scheduled delivery end time of the selected movable body.

(An aspect 16) The processing code may be further configured to cause the at least one processor to display, separately for each of the users, at least one of an upper limit value of a weight and an upper limit value of a volume of one or more items orderable per person.

(An aspect 17) The processing code may be further configured to cause the at least one processor to display, separately for each of the users, at least one of a total weight and a total volume of the one or more items sorted for each of the users.

(An aspect 18) The processing code may be further configured to cause the at least one processor to display, separately for each of the users, at least one of a set including an upper limit value of a weight of one or more items orderable per person and a total weight of the one or more items sorted for each of the users and a set including an upper limit value of the volume of one or more items orderable per person and a total volume of the one or more items sorted for each of the users.

(An aspect 19) In a case where a total value obtained by summing each total weight of the one or more items sorted for each of the users exceeds an upper limit value of a weight of one or more items that can be mounted on the movable body per delivery, the processing code may be further configured to cause the at least one processor to display an alert to a user having a highest total weight of the one or more items sorted for each of the users among the plurality of users.

(An aspect 20) In a case where a total value obtained by summing each total volume of the one or more items sorted for each of the users exceeds an upper limit value of a volume of one or more items that can be mounted on the movable body per delivery, the processing code may be further configured to cause the at least one processor to display an alert to a user having a highest total volume of the one or more items sorted for each of the users among the plurality of users.

(An aspect 21) The program code may further include seventh reception code configured to cause the at least one processor to receive a cancellation instruction of selection of one or more items sorted for the user who is a target of the alert. The processing code may be further configured to cause the at least one processor to cancel the selection of the one or more items on the basis of the cancellation instruction.

(An aspect 22) The items may be a set item in which a plurality of items are put together, and the second reception code may be further configured to cause the at least one processor to receive selection of one or more items in the set item as selection of a first user among the plurality of users, and receive selection of the other remaining one or more items in the set item as selection of a second user among the plurality of users.

(An aspect 23) An order processing method executed by a computer is configured to be able to, regarding an order of one or more items to be delivered by a movable body, collectively receive the respective orders of a plurality of users. The order processing method includes: receiving designation of the number of the users related to the order; receiving selection of the items related to the order; and for each of as many users as the designated number of the users, sorting the selected items and performing settlement for the sorted items.

(An aspect 24) An order reception terminal is configured to be able to, regarding an order of one or more items to be delivered by a movable body, collectively receive the respective orders of a plurality of users, and the order reception terminal includes: at least one memory configured to store program code; and at least one processor configured to access the program code and operate as instructed by the program code. The program code includes: first reception code configured to cause the at least one processor to receive designation of the number of the users related to the order; second reception code configured to cause the at least one processor to receive selection of the items related to the order; and processing code configured to cause the at least one processor to, for each of as many users as the designated number of the users, sort the selected items and perform settlement for the sorted items.

DETAILED DESCRIPTION

Hereinbelow, an order processing system according to one or more embodiments of the present invention will be described with reference to the drawings.

[1. Configuration and Operation Outline of Order Processing System S]

Figure 1:
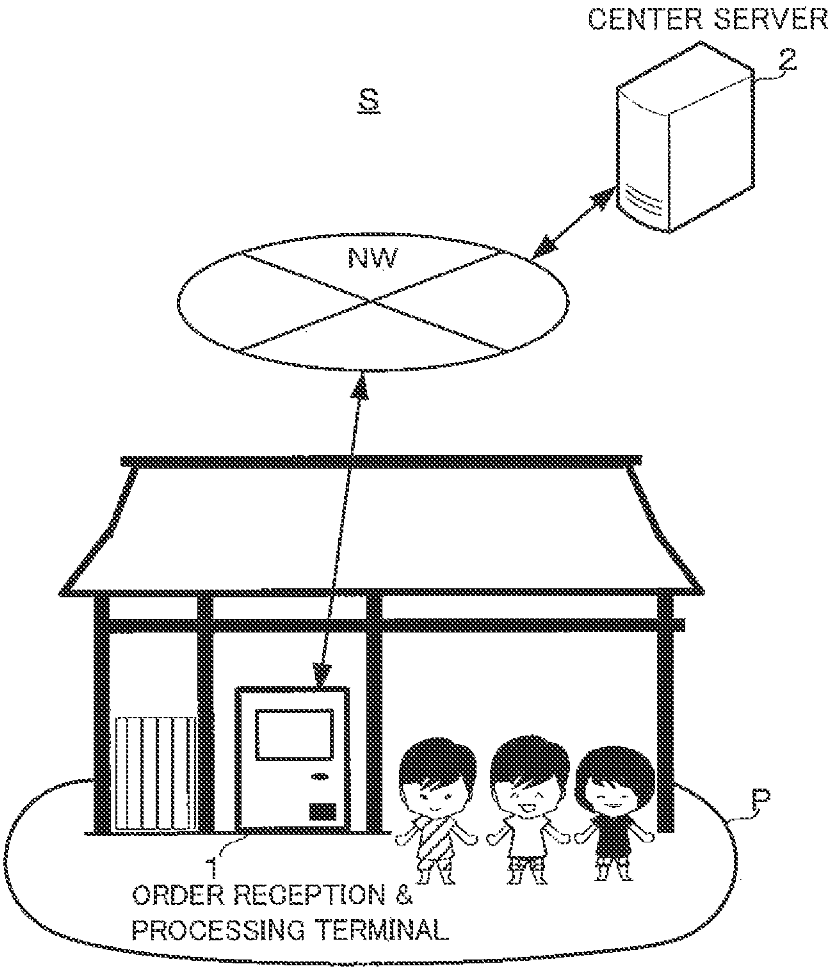
FIG. 1 is a diagram illustrating a schematic configuration example of an order processing system S.

First, a configuration and an operation outline of an order processing system S according to the present embodiment will be described with reference to FIG. 1. The order processing system S is a system capable of collectively receiving orders of a plurality of persons regarding orders of items (e.g., products) to be delivered by a delivery vehicle (an example of a movable body). Incidentally, as the delivery vehicle, for example, an unmanned aerial vehicle (hereinbelow referred to as "UAV (Unmanned Aerial Vehicle)") such as a drone, an unmanned ground vehicle (hereinbelow referred to as UGV (Unmanned Ground Vehicle)), a package transport truck (automobile), or the like is used. FIG. 1 is a diagram illustrating a schematic configuration example of the order processing system S. As illustrated in FIG. 1, the order processing system S includes an order reception & processing terminal 1 (examples of an order reception terminal and a first terminal), a center server 2, and the like. The order reception & processing terminal 1 can access the center server 2 via a communication network NW. The communication network NW includes the Internet, a mobile communication network and wireless base stations thereof, or the like.

The order reception & processing terminal 1 is a terminal used by a plurality of persons (hereinbelow, referred to as "users") constituting a group (some kind of gathering), can collectively receive an order (order of one or more items) of each of the plurality of users (orderers) in the group, and processes the received order. That is, the plurality of persons can simultaneously place orders (this is also referred to as a "group order" (an example of a first order)). Here, the order is an order of one or more items as a delivery target, and can be referred to as a purchase of one or more items and a delivery request. The order reception & processing terminal 1 is preferably installed at a place P (for example, a local community place) where the plurality of users gather. A delivery destination of the ordered items is preferably, for example, a place where the order reception & processing terminal 1 is installed or a neighborhood thereof. Moreover, the order reception & processing terminal 1 may be used at different times by the plurality of groups, respectively.

Incidentally, although FIG. 1 illustrates one order reception & processing terminal 1, the order reception & processing terminal 1 may be installed in each of a plurality of different places. The center server 2 can collectively receive the orders of the plurality of users in the group from the order reception & processing terminal 1 via the communication network NW, and processes the received orders (group order). Furthermore, the center server 2 can receive an order of an individual user from a user terminal (an example of a second terminal used for selecting one or more items related to the order) used by the individual user other than the group via the communication network NW, and processes the received order (this is also referred to as an "individual order" (an example of a second order)).

[1-1. Configuration and Function of Order Reception & Processing Terminal 1]

Figure 2:
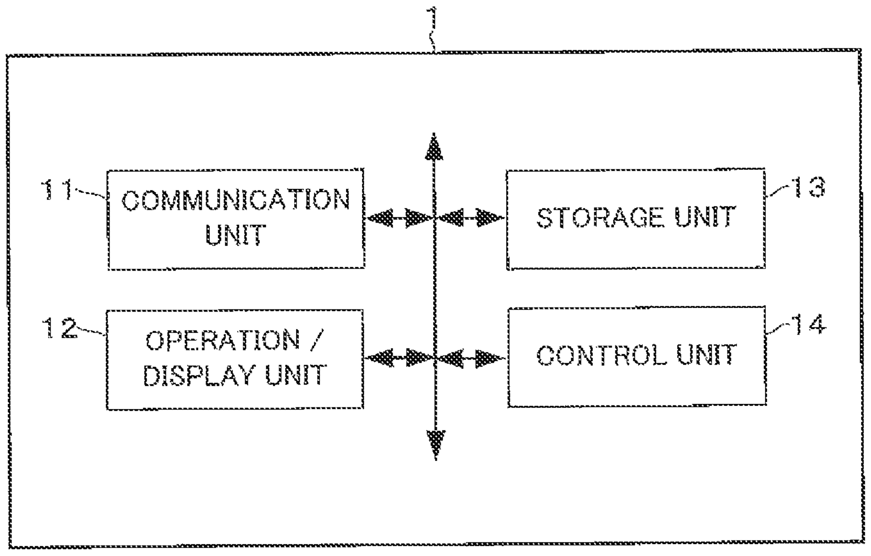
FIG. 2 is a diagram illustrating a schematic configuration example of an order reception & processing terminal 1.

Next, a configuration and a function of the order reception & processing terminal 1 will be described with reference to FIG. 2 and the like. FIG. 2 is a diagram illustrating a schematic configuration example of the order reception & processing terminal 1. As illustrated in FIG. 2, the order reception & processing terminal 1 includes a communication unit 11, an operation/display unit 12, a storage unit 13, a control unit 14, and the like. The order reception & processing terminal 1 may include a reader/writer capable of communicating with a settlement IC (Integrated Circuit) chip used for a credit card settlement, an electronic money settlement, or the like in a contact or contactless manner. The settlement IC chip is mounted on a settlement card (for example, a credit card or an electronic money card), a mobile terminal (for example, a smartphone), or the like. The reader/writer is controlled by the control unit 14. Moreover, the order reception & processing terminal 1 may include a cash reception mechanism used for a cash payment. The cash reception mechanism is controlled by the control unit 14. Incidentally, the order reception & processing terminal 1 may include a sound processing unit and a loudspeaker.

The communication unit 11 controls communication performed via the communication network NW. The operation/display unit 12 includes a display (for example, a touch panel display), and has an input function of inputting a user instruction (user operation) by means of the user's finger, a pen, or the like, and a display function of displaying various screens. The storage unit 13 includes, for example, a hard disk drive, and stores an operating system and various programs including an order processing application program. Moreover, the storage unit 13 stores screen data for displaying the various screens and an identifier (id) of the order reception & processing terminal 1.

The control unit 14 includes at least one CPU (Central Processing Unit), a ROM (Read Only Memory), a RAM (Random Access Memory), and the like. The CPU (an example of processor) is configured to access the program code stored in the ROM or the storage unit 13 and operate as instructed by the program code. The program code includes: first reception code configured to cause the CPU to receive designation of the number of the users related to the order; second reception code configured to cause the CPU to receive selection of the items related to the order; and processing code configured to cause the CPU to sort and display the selected items for each of as many users as the designated number of the users. Furthermore, the program code includes processing code configured to cause the CPU to, for each of as many users as the designated number of the users, sort the selected items and perform settlement for the sorted items. Moreover, the program code may include third reception code configured to cause the CPU to receive an instruction for sorting the items related to the order. Moreover, the program code may include fourth reception code configured to cause the CPU to receive a cancellation instruction of selection of one or more items sorted for the user who is a target of the alert. Moreover, the program code may further include seventh reception code configured to cause the CPU to receive the order on each of the screens. Moreover, the program code may include allocation code configured to cause the CPU to allocate different delivery fees for the plurality of users to the respective users on the basis of order contents of the respective users.

Figure 3:
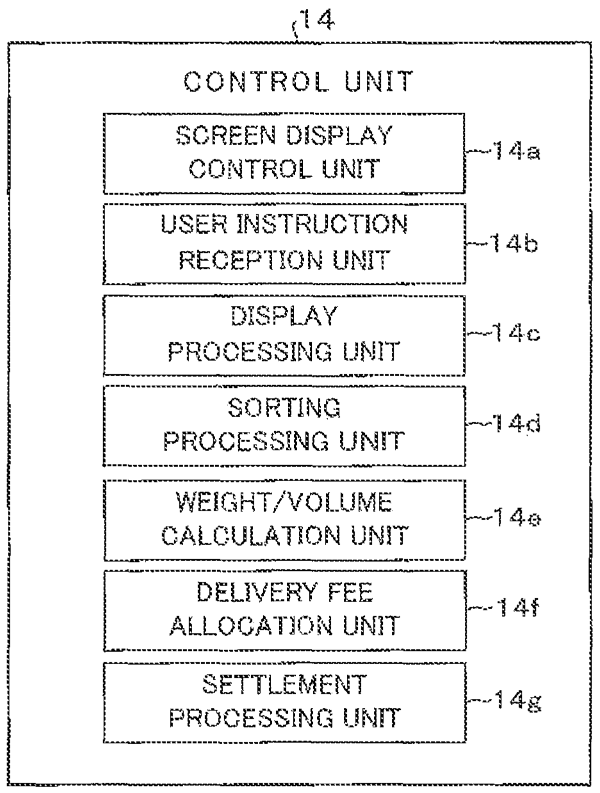
FIG. 3 is a diagram illustrating an example of functional blocks in a control unit 14.

FIG. 3 is a diagram illustrating an example of functional blocks in the control unit 14. As illustrated in FIG. 3, the control unit 14 functions as a screen display control unit 14*a*, a user instruction reception unit 14*b*, a display processing unit 14*c*, a sorting processing unit 14*d*, a weight/volume calculation unit 14*e*, a delivery fee allocation unit 14*f*, a settlement processing unit 14*g*, and the like in accordance with the order processing application (application that defines an order processing method) program (program code group) stored in the ROM or the storage unit 13.

The screen display control unit 14*a* displays the various screens on the display of the operation/display unit 12. Examples of the various screens include a number-of-ordering-persons designation screen, an item selection screen, an item sorting screen, an order content confirmation screen, and a settlement screen. The user instruction reception unit 14*b* receives a user instruction via the operation/display unit 12. Examples of the user instruction include a screen display instruction, designation of the number of users related to the orders (hereinbelow referred to as a "number of ordering persons"), designation of an item search condition, item selection (selection instruction), an item sorting instruction, an order content confirmation instruction, an item selection cancellation instruction, an item delivery timing selection, a settlement method selection, and a settlement instruction (also referred to as an order in a narrow sense). Here, the item selection and the item sorting instruction may be performed at different times, or may be performed at the same time. The screen display control unit 14*a* causes the display to display any of the various screens according to the screen display instruction received by the user instruction reception unit 14*b*.

Figure 4:
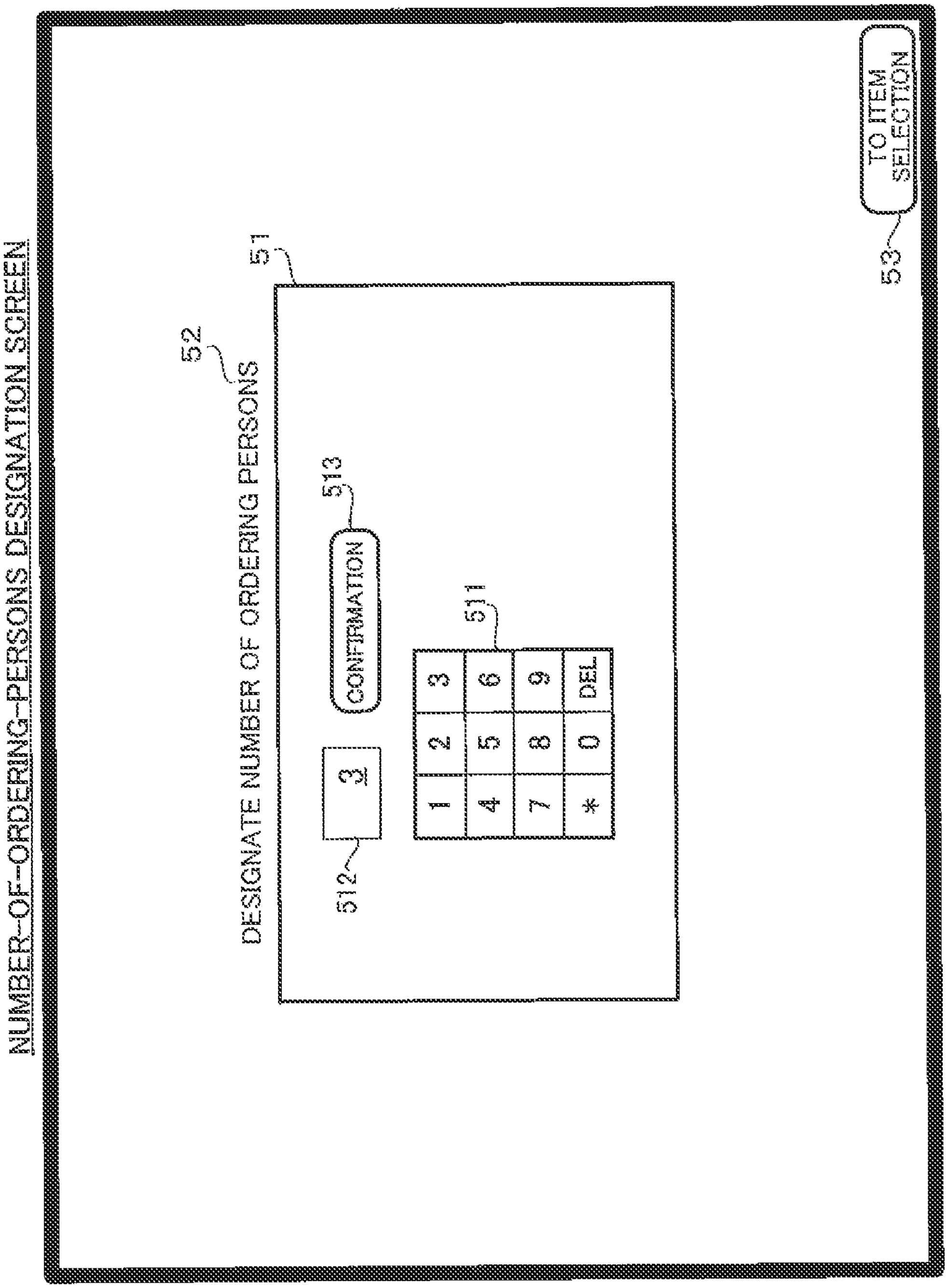
FIG. 4 is a diagram illustrating a display example of a number-of-ordering-persons designation screen.

The display processing unit 14*c* displays information prompting a user instruction, information regarding the item (for example, a name and a price of the item), information regarding delivery (for example, a delivery timing and a delivery fee), information regarding settlement (for example, a payment amount and a settlement method), and the like on the various screens. For example, the display processing unit 14*c* displays information prompting designation of the number of ordering persons on the number-of-ordering-persons designation screen. FIG. 4 is a diagram illustrating a display example of the number-of-ordering-persons designation screen. On the number-of-ordering-persons designation screen illustrated in FIG. 4, a number-of-ordering-persons designation area 51 is provided, and information 52 prompting designation (input) of the number of ordering persons is displayed.

When the number of ordering persons is designated in the number-of-ordering-persons designation area 51, designation of the number of ordering persons is received by the user instruction reception unit 14*b*. For example, when a number corresponding to the number of ordering persons is input from a numeric keypad 511, the number is displayed in an input field 512. Thereafter, the designation of the number of ordering persons is received by pressing a "CONFIRMATION" button 513. The number of ordering persons may be designated by, for example, any one of the plurality of users in the group (hereinbelow referred to as a "representative"). Incidentally, when the designation of the number of ordering persons is received, as many user identifiers (ids) as the number of ordering persons are set for management. For example, in a case where the number of ordering persons is three, a user identifier "01" is set for a user a, a user identifier "02" is set for a user b, and a user identifier "03" is set for a user c. Moreover, names (which may be nicknames) of the users a to c may be input when the number of ordering persons is designated.

Figure 5:
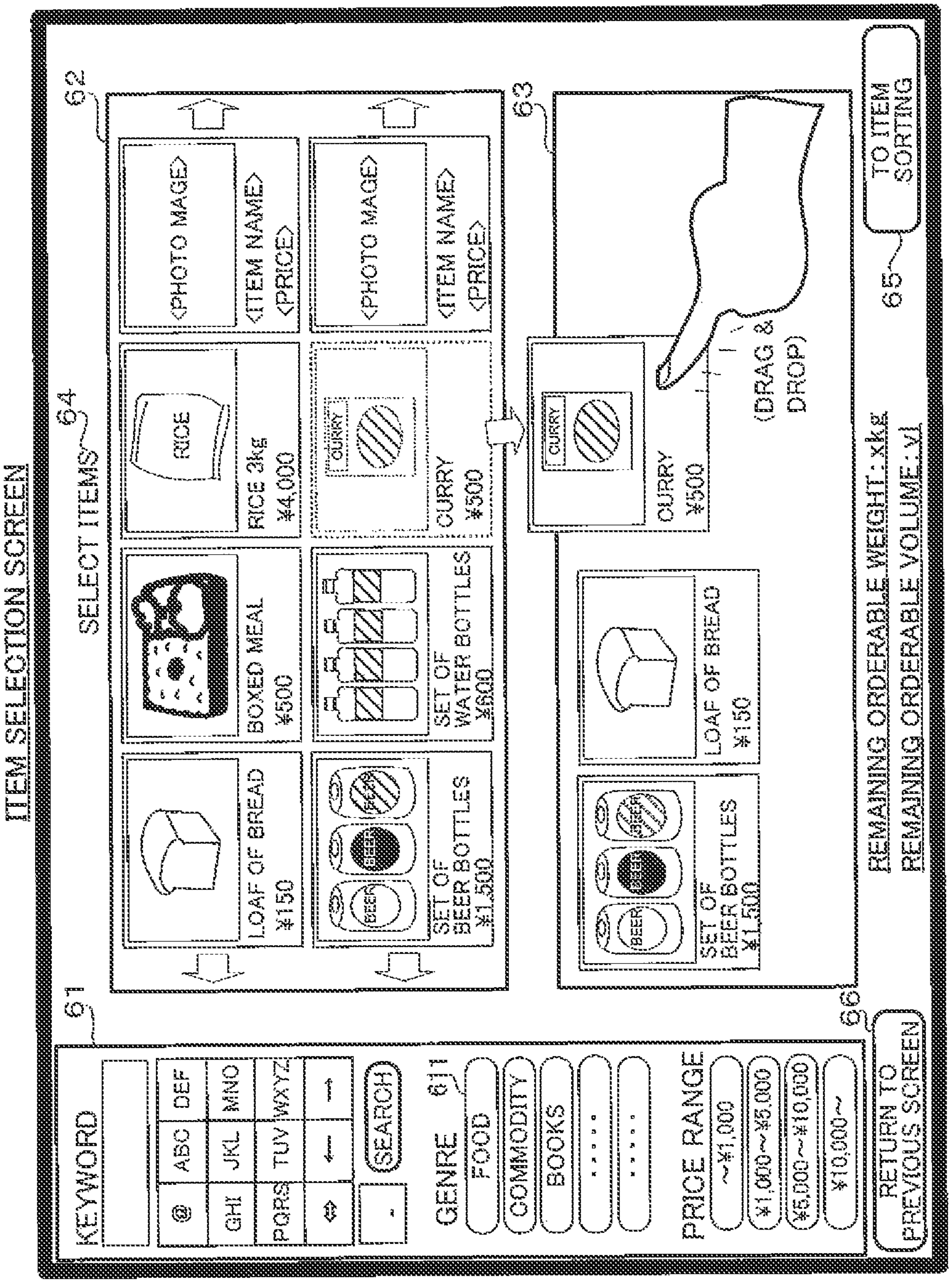
FIG. 5 is a diagram illustrating a display example of an item selection screen (common screen).

Moreover, the display processing unit 14*c* displays information prompting selection of the one or more items related to the order on the item selection screen (screen for the user to select the one or more items). FIG. 5 is a diagram illustrating a display example of the item selection screen (common screen). The item selection screen illustrated in FIG. 5 is displayed, for example, by pressing a "TO ITEM SELECTION" button 53 provided on the number-of-ordering-persons designation screen illustrated in FIG. 4. The item selection screen illustrated in FIG. 5 is provided with a search condition designation area 61, a selection option item display area 62, a selected item display area 63, and the like, and displays information 64 prompting the item selection.

When the search conditions (for example, a keyword, a genre, and a price range) is designated in the search condition designation area 61, designation of the search condition is received by the user instruction reception unit 14*b*. For example, when a "FOOD" button 611 in the genre (category) indicated in the search condition designation area 61 is pressed, designation of the search condition (food) is received. A search query including the search condition designated in this manner is transmitted from the order reception & processing terminal 1 to the center server 2 via the communication network NW, for example, so that one or more items satisfying the search condition are searched. Then, a search result including information regarding the searched items is transmitted from the center server 2 to the order reception & processing terminal 1 via the communication network NW. Incidentally, examples of the item genres include food (including beverages), commodity (daily necessities), books, and electric appliances. Moreover, the item may be a set item in which a plurality of items (for example, a plurality of identical items or a plurality of different items) are put together. For example, the set item is a set of N (N is a natural number of two or more) bottles of beer or a set of fresh foods including vegetables and meat.

Moreover, the display processing unit 14*c* displays, for example, a name (item name), a price, and a photographic image of an item serving as a selection option in a selection option item display area 62 as information regarding the item. Examples of the item serving as the selection option include a recommended item and an item searched on the basis of the search condition. When the item related to the order is selected from the plurality of items in the selection option item display area 62, the item selection is received by the user instruction reception unit 14*b*. The item selection may be performed by the representative in the group or may be performed by each of the users in the group. At this time, by designating quantity of the selected one or more items, the designated quantity may be received. However, if the quantity is not designated, it is recognized as one.

Meanwhile, in a case where the item serving as the selection option is the set item, the user instruction reception unit 14*b* can receive selection of some items in the set item as selection of a first user (for example, the user a) among the plurality of users in the group, and can receive selection of the other remaining items in the set item as selection of a second user (for example, the user b and the user c) among the plurality of users. As a result, it is possible to enhance convenience of the group order in which the plurality of users simultaneously place orders.

Moreover, the display processing unit 14*c* displays, for example, the name, the price, and the photographic image of the item in the selected item display area 63 as information regarding the selected item. For example, as illustrated in FIG. 5, the item selection may be performed by moving (for example, drag & drop) the photographic image or the like of the item in the selection option item display area 62 to the selected item display area 63. Alternatively, the item selection may be performed by double-tapping the photographic image or the like of the item in the selection option item display area 62, or may be selected by another method. In a case where the item in the selection option item display area 62 is selected and becomes out of stock, information regarding the item is deleted (the display is erased) from the selection option item display area 62. On the other hand, in a case where the item in the selection option item display area 62 is selected but is still in stock, the information regarding the item remains displayed in the selection option item display area 62.

Further, as illustrated in FIG. 5, the display processing unit 14*c* preferably displays on the item selection screen at least one of a remaining orderable (selectable) weight and a remaining orderable (selectable) volume. The remaining orderable weight is a weight obtained by subtracting a total weight of the selected one or more items from an upper limit value (hereinbelow, referred to as a "mountable weight upper limit value for the delivery vehicle") of a weight of one or more items that can be mounted (loaded) on the delivery vehicle (that is, one delivery vehicle) per delivery. Here, the "weight of one or more items that can be mounted on the delivery vehicle" means, for example, a weight enabling the UAV or UGV to fly or travel with the one or more items housed in a housing box (in other words, a storage space) provided in the UAV or the UGV.

On the other hand, the remaining orderable volume is a volume obtained by subtracting a total volume of the selected one or more items from an upper limit value (hereinbelow, referred to as a "mountable volume upper limit value for the delivery vehicle") of a volume of one or more items that can be mounted on the delivery vehicle per delivery. Here, the "volume of one or more items that can be mounted on the delivery vehicle" means, for example, a volume (that is, a volume of the housing box) enabling the UAV or UGV to fly or travel with the one or more items housed in the housing box provided in the UAV or the UGV. Display of the remaining orderable weight and the remaining orderable volume is updated each time an item is selected. Incidentally, a superordinate concept including the mountable weight upper limit value and the mountable volume upper limit value for the delivery vehicle is referred to as a "loading capacity". Such a loading capacity can be referred to as a loading capacity for one delivery vehicle, or can be referred to as a loading capacity to be allocated per user in the group in one delivery vehicle.

Figure 6:
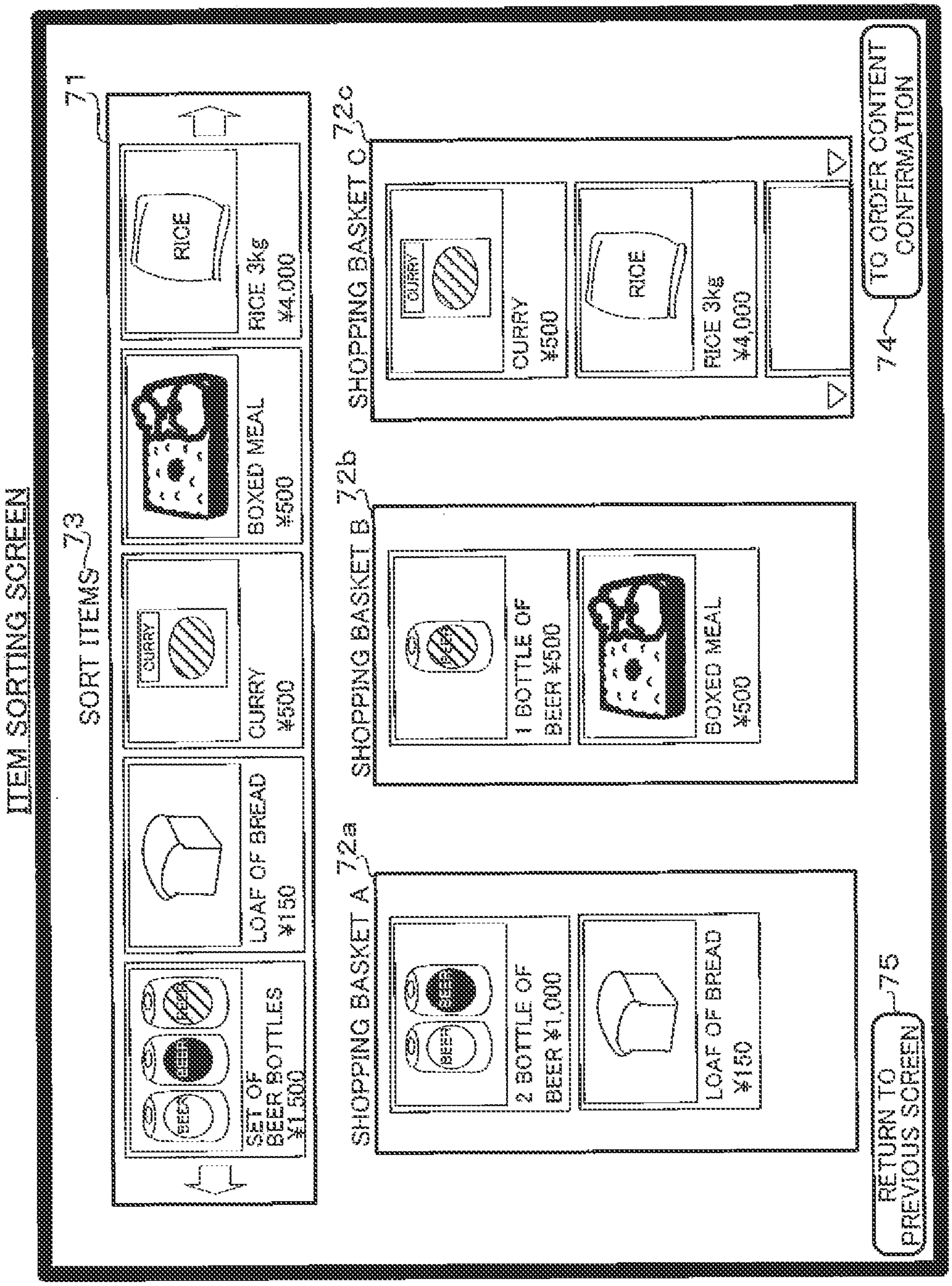
FIG. 6 is a diagram illustrating a display example of an item sorting screen (common screen).

Moreover, the display processing unit 14*c* displays information prompting the sorting instruction of the items related to the order on the item sorting screen (screen for the user to instruct sorting of the items). FIG. 6 is a diagram illustrating a display example of the item sorting screen (common screen). The item sorting screen illustrated in FIG. 6 is displayed, for example, by pressing a "TO ITEM SORTING" button 65 provided on the item selection screen illustrated in FIG. 5. The item sorting screen illustrated in FIG. 6 is provided with a selected item display area 71, sorted item display areas (shopping baskets) 72*a* to 72*c*, and the like, and displays information 73 prompting the sorting instruction of the selected items.

Moreover, the display processing unit 14*c* displays, for example, the names, the prices, and the photographic images of the items in the selected item display area 71 as information regarding the selected items. When the sorting instruction of the items in the selected item display area 71 is issued, the item sorting instruction is received by the user instruction reception unit 14*b*. Here, the item sorting instruction can also be referred to as an instruction to associate the selected items with any user. The item sorting instruction may be performed by the representative in the group, or may be performed by each of the users in the group. Similarly to the case of the item selection, the item sorting instruction may be issued by moving (for example, drag & drop) the photographic image or the like of the item in the selected item display area 71 to any one of the sorted item display areas 72*a* to 72*c*, or may be performed by another method.

The sorted item display areas 72*a* to 72*c* are set corresponding to as many users as the number of ordering persons, respectively. For example, in a case where the number of ordering persons is three, the sorted item display areas 72*a* to 72*c* for three persons are set. At this time, the user identifier "01" is associated with the sorted item display area 72*a*, the user identifier "02" is associated with the sorted item display area 72*b*, and the user identifier "03" is associated with the sorted item display area 72*c*. Incidentally, in the sorted item display areas 72*a* to 72*c*, "A", "B", and "C" are displayed as user notations, but instead of these, "FIRST PERSON", "SECOND PERSON", and "THIRD PERSON" may be displayed. Alternatively, in a case where names of the users a to c are input at the time of designating the number of ordering persons, the names of the users a to c may be displayed instead of "A", "B", and "C".

The sorting processing unit 14*d* performs processing of sorting (that is, classifying and dividing for the respective users) the items instructed to be selected and sorted for as many users as the designated number of ordering persons. In such sorting processing, an identifier (id) of the item instructed to be sorted is associated with the user identifier of any user. The identifier of the item instructed to be sorted is associated with any of the sorted item display areas 72*a* to 72*c*. The display processing unit 14*c* distinguishes information regarding the sorted items (for example, the names, the prices, and the photographic images of the items) for the corresponding users (as many users as the number of ordering persons) in the group and displays them on the sorted item display areas 72*a* to 72*c*. In this manner, the sorting processing unit 14*d* and the display processing unit 14*c* sort and display the items instructed to be selected and sorted for each of as many users as the number of ordering persons.

Incidentally, in the above description, a case where the item selection and the item sorting instruction are performed at different times using the item selection screen and the item sorting screen has been described. However, in a case where the item selection and the item sorting instruction are performed at the same time, an item selection & sorting screen (a screen for the user to simultaneously perform the item selection and the item sorting instruction) in which the item selection screen and the item sorting screen are integrated is used.

Figure 7:
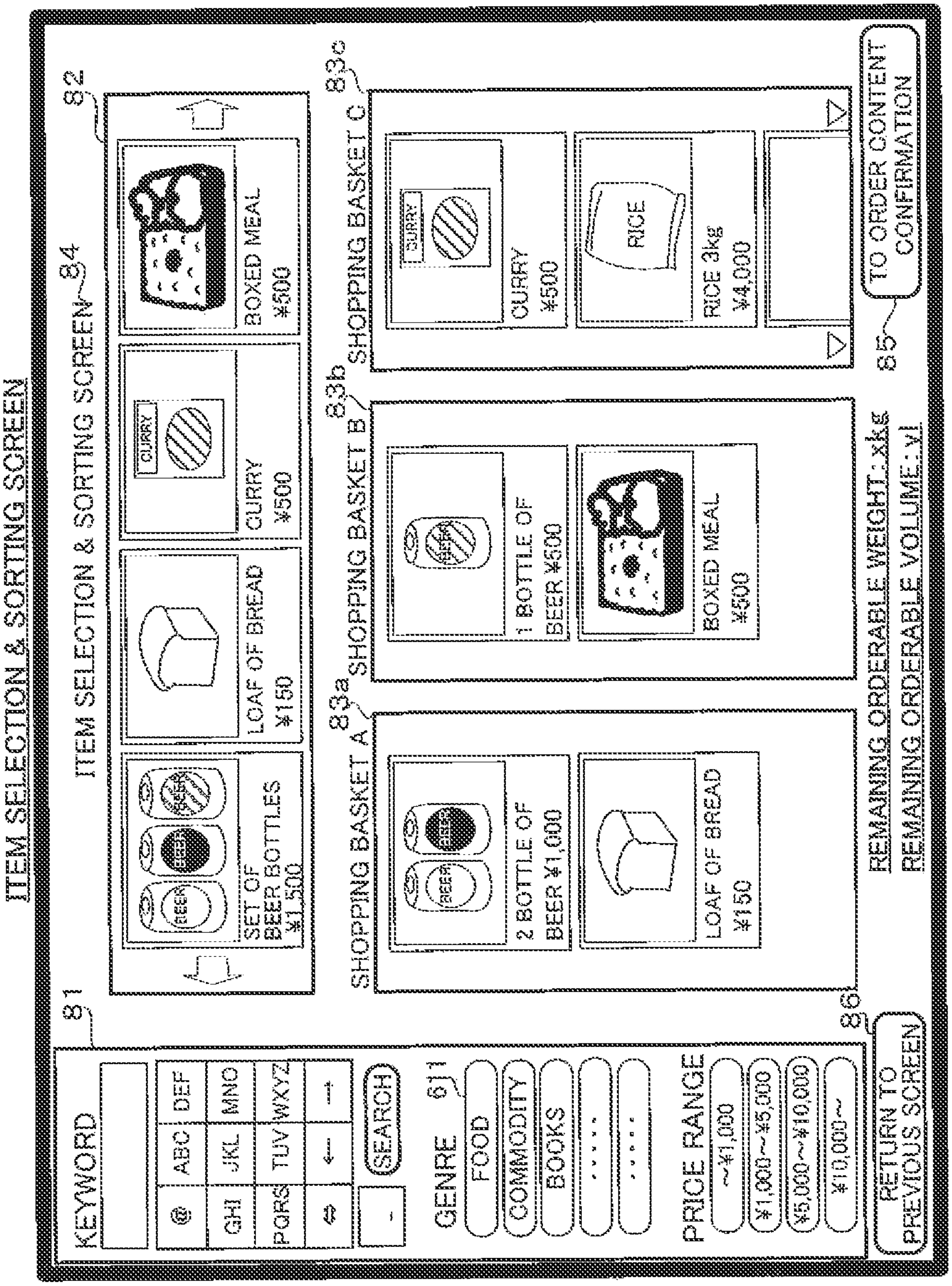
FIG. 7 is a diagram illustrating a display example of an item selection & sorting screen (common screen).

FIG. 7 is a diagram illustrating a display example of the item selection & sorting screen (common screen). The item selection & sorting screen illustrated in FIG. 7 is displayed on the display, for example, by pressing the "TO ITEM SELECTION" button 53 provided on the number-of-ordering-persons designation screen illustrated in FIG. 4. The item selection & sorting screen illustrated in FIG. 7 is provided with a search condition designation area 81, a selection option item display area 82, a selected & sorted item display areas 83*a* to 83*c*, and the like, and displays information 84 prompting item selection & sorting. Here, display functions of the search condition designation area 81 and the selection option item display area 82 are similar to display functions of the search condition designation area 61 and the selection option item display area 62 illustrated in FIG. 5. Similarly to the sorted item display areas 72*a* to 72*c* illustrated in FIG. 6, the selected & sorted item display areas 83*a* to 83*c* are set corresponding to as many users as the number of ordering persons (that is, the areas are associated with the corresponding user identifiers).

In the item selection & sorting screen illustrated in FIG. 7, when the item related to the order is selected and instructed to be sorted from the plurality of items in the selection option item display area 82, the item selection and sorting instruction is received by the user instruction reception unit 14*b*. The item selection and sorting instruction may be performed by the representative in the group, or may be performed by each of the users in the group. At this time, by designating quantity of the one or more items selected and instructed to be sorted, the designated quantity may be received. However, if the quantity is not designated, it is recognized as one.

The sorting processing unit 14*d* sorts the items instructed to be selected and sorted for as many users as the number of ordering persons, and the display processing unit 14*c* distinguishes information regarding the sorted items (for example, the names, the prices, and the photographic images of the items) for the corresponding users in the group and displays them on the selected & sorted item display areas 83*a* to 83*c*. Incidentally, similarly to the case of the item selection, the item selection and sorting instruction may be issued by moving (for example, drag & drop) the photographic image or the like of the item in the selection option item display area 82 to any one of the selected & sorted item display areas 83*a* to 83*c*, or may be performed by another method.

Figure 8:
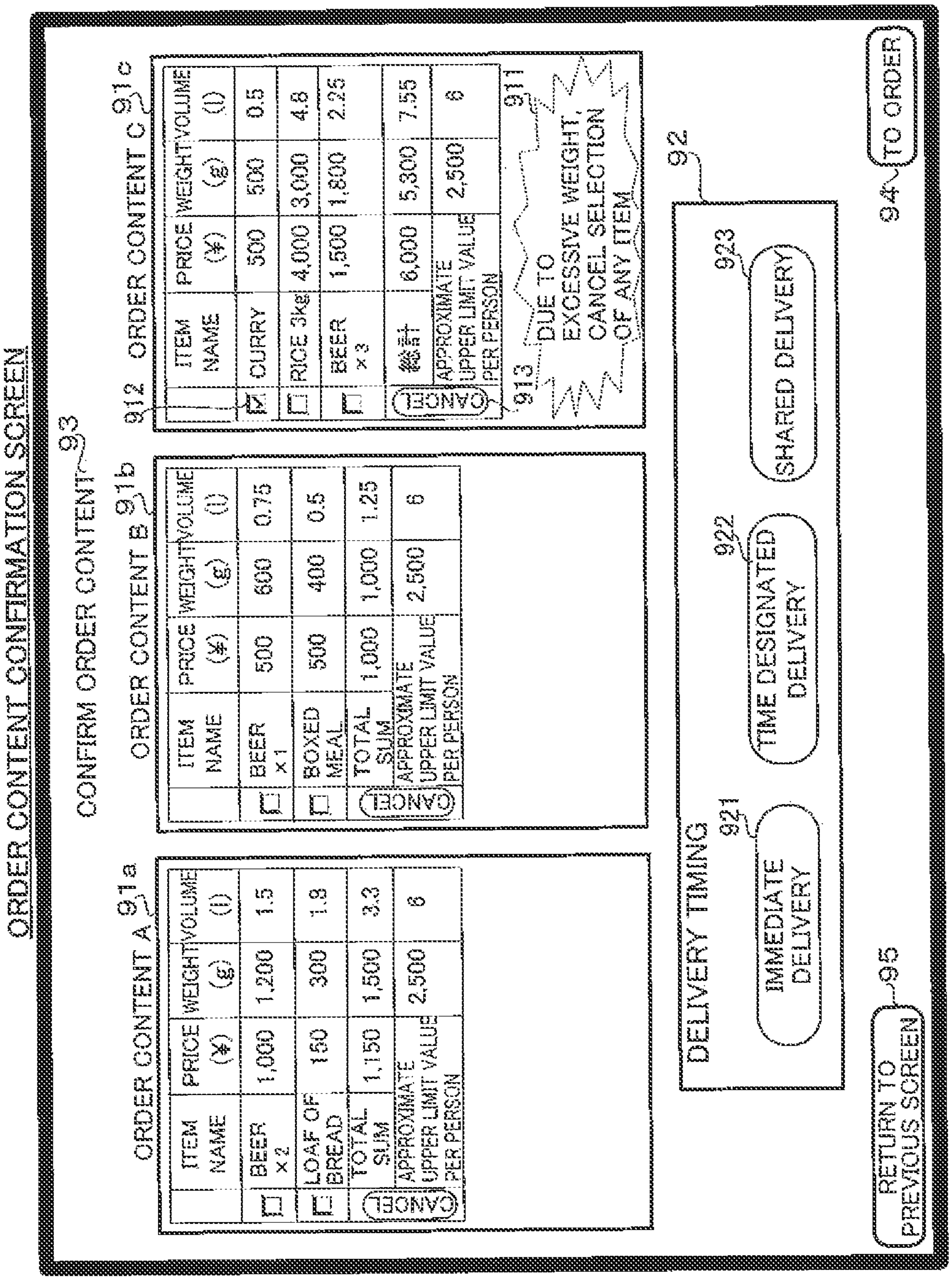
FIG. 8 is a diagram illustrating a display example of an order content confirmation screen (common screen).

Moreover, the display processing unit 14*c* displays information prompting an order content confirmation instruction on an order content confirmation screen (a screen for the user to confirm an order content, also referred to as an order content check screen). FIG. 8 is a diagram illustrating a display example of the order content confirmation screen (common screen). The order content confirmation screen illustrated in FIG. 8 is displayed, for example, by pressing a "TO ORDER CONTENT CONFIRMATION" button 74 provided on the item sorting screen illustrated in FIG. 6 or a "TO ORDER CONTENT CONFIRMATION" button 85 provided on the item selection & sorting screen illustrated in FIG. 7. The order content confirmation screen illustrated in FIG. 8 is provided with order content confirmation areas 91*a* to 91*c*, a delivery timing selection area 92, and the like, and displays information 93 prompting confirmation of the order content. Similarly to the sorted item display areas 72*a* to 72*c*, the order content confirmation areas 91*a* to 91*c* are set corresponding to as many users as the number of ordering persons, respectively.

Moreover, the display processing unit 14*c* distinguishes information regarding the sorted items (for example, the names, the prices, the weights, and the volumes of the items) for the corresponding users in the group and displays them on the order content confirmation areas 91*a* to 91*c*. Here, a size (width×depth×height) of each of the items may be displayed instead of or in addition to the volume of the item. Incidentally, when the instruction to cancel the selection of any item in the order content confirmation areas 91*a* to 91*c* is issued, the user instruction reception unit 14*b* receives the instruction to cancel the selection of the item. As a result, the item selection is canceled on the basis of the item selection cancellation instruction, and the information regarding the item is deleted (the display is erased) from any of the order content confirmation areas 91*a* to 91*c*.

Moreover, the display processing unit 14*c* preferably displays, separately for each of the users in the group, at least one (in the example in FIG. 8, both a set of weights and a set of volumes) of a set including an upper limit value (approximate upper limit value per person) of a weight of one or more items orderable per person and a total weight (that is, a total weight for each user) of the one or more items sorted for each of the users in the group and a set including an upper limit value (approximate upper limit value per person) of a volume of one or more items orderable per person and a total volume (that is, a total volume for each user) of the one or more items sorted for each of the users in the group in the order content confirmation areas 91*a* to 91*c*. As a result, each of the users in the group can grasp the loading capacity appropriate for ordering and can be prompted to make the order amount of each of the users in the group fair.

Here, the upper limit value of the weight of one or more items orderable per person is, for example, a value (in the example in FIG. 8, 2,500 g) obtained by equally dividing the mountable weight upper limit value for the delivery vehicle by the number of ordering persons. The mountable weight upper limit value for the delivery vehicle may be set by default or may be acquired from the center server 2 via the communication network NW. The upper limit value of the weight of one or more items orderable per person and the total weight of the one or more items sorted for each of the users in the group are respectively calculated by the weight/volume calculation unit 14*e*. Incidentally, in the example in FIG. 8, the upper limit value of the weight of one or more items orderable per person is merely an approximate value, and in this example, it does not mean that each user cannot order items exceeding the upper limit value.

On the other hand, the upper limit value of the volume of one or more items orderable per person is, for example, a value (in the example in FIG. 8, 61) obtained by equally dividing the mountable volume upper limit value for the delivery vehicle by the number of ordering persons. The mountable volume upper limit value for the delivery vehicle may be set by default or may be acquired from the center server 2 via the communication network NW. The upper limit value of the volume of one or more items orderable per person and the total volume of the one or more items sorted for each of the users in the group are respectively calculated by the weight/volume calculation unit 14*e*. Incidentally, in the example in FIG. 8, the upper limit value of the volume of one or more items orderable per person is merely an approximate value, and in this example, it does not mean that each user cannot order items exceeding the upper limit value.

Moreover, the display processing unit 14*c* may display, separately for each of the users in the group, at least one of the set including the upper limit value of the weight of one or more items orderable per person and the total weight of the one or more items sorted for each of the users in the group and the set including the upper limit value of the volume of one or more items orderable per person and the total volume of the one or more items sorted for each of the users in the group in the sorted item display areas 72*a* to 72*c* on the item sorting screen illustrated in FIG. 6 (or in the selected & sorted item display areas 83*a* to 83*c* illustrated in FIG. 7). In this case, every time the item is sorted, at least one of the total weight and the total volume of the items displayed in any one of the sorted item display areas 72*a* to 72*c* (or the selected & sorted item display areas 83*a* to 83*c* illustrated in FIG. 7) is updated.

Moreover, the display processing unit 14*c* may display, separately for each of the users in the group, any one of the upper limit value of the weight of one or more items orderable per person and the upper limit value of the volume thereof in the order content confirmation areas 91*a* to 91*c* without displaying the total weight of the one or more items sorted for each of the users in the group and the total volume thereof. As a result, each of the users in the group can grasp the loading capacity appropriate for ordering and can be prompted to make the order amount of each of the users in the group fair. Alternatively, the display processing unit 14*c* may display, separately for each of the users in the group, any one of the total weight of the one or more items sorted for each of the users in the group and the total volume thereof in the order content confirmation areas 91*a* to 91*c* without displaying the upper limit value of the weight of one or more items orderable per person and the upper limit value of the volume thereof. As a result, each of the users in the group can easily grasp the order amount of each of the plurality of users in the group.

Furthermore, the weight/volume calculation unit 14*e* may calculate a total value (hereinbelow referred to as a "total order weight value") obtained by summing the total weights of the one or more items sorted for each of the users in the group of the plurality of users. In the example in FIG. 8, the total value obtained by summing the total weights of the users a to c is calculated as "7,800 g". The weight/volume calculation unit 14*e* determines whether or not the total order weight value exceeds the mountable weight upper limit value (in the example in FIG. 8, "7,500 g") for the delivery vehicle. In a case where the total order weight value exceeds the mountable weight upper limit value for the delivery vehicle, the display processing unit 14*c* may display an alert for a user having the highest total weight of the one or more items sorted for each of the users (that is, having the highest weight ratio) among the plurality of users in the group. As a result, each of the users in the group can be prompted to make the order amount of each of the users in the group fair. In the example in FIG. 8, an alert 911 is displayed in the order content confirmation area 91*c* associated with the user identifier "03" of the user c.

Moreover, the weight/volume calculation unit 14*e* may calculate a total value (hereinbelow referred to as a "total order volume value") obtained by summing the total volumes of the one or more items sorted for each of the users in the group of the plurality of users. The weight/volume calculation unit 14*e* determines whether or not the total order volume value exceeds the mountable volume upper limit value for the delivery vehicle. In a case where the total order volume value exceeds the mountable volume upper limit value for the delivery vehicle, the display processing unit 14*c* displays an alert for a user having the highest total volume of the one or more items sorted for each of the users (that is, having the highest volume ratio) among the plurality of users in the group. As a result, each of the users in the group can be prompted to make the order amount of each of the users in the group fair. Incidentally, the alert may be output by sound via the sound processing unit and the loudspeaker.

The user who is a target of the alert gives the instruction to cancel the selection of any item in any of the order content confirmation areas 91*a* to 91*c*, so that the user instruction reception unit 14*b* receives the instruction to cancel the selection of the item. For example, as illustrated in FIG. 8, the user c, who is the target of the alert 911, checks a check box 912 corresponding to an item whose selection is to be canceled, and then presses a "CANCEL" button 913, so that the instruction to cancel the selection of the item (that is, the item sorted for the user c) is received. As a result, the selection of the sorted item is canceled and deleted from the order content confirmation area 91*c*. Therefore, the order amounts of the respective users in the group can be fair. Incidentally, the canceled item may be set as a delivery target to a delivery vehicle scheduled to depart after the delivery vehicle that delivers the items in the order content confirmation areas 91*a* to 91*c*. For example, the canceled item may be included in the delivery target by a "shared delivery" described below. Moreover, for example, in a case where the user (user c) who is the target of the alert does not cancel the selection of any item in the order content confirmation area 91*c*, two delivery vehicles may be allocated for delivery.

Alternatively, in a case where the total order weight value exceeds the mountable weight upper limit value for the delivery vehicle, a large delivery vehicle having a higher mountable weight upper limit value than the delivery vehicle may be selected. In this case, the weight/volume calculation unit 14*e* determines whether or not the total order weight value exceeds the mountable weight upper limit value for the large delivery vehicle. In a case where the total order weight value is equal to or less than the mountable weight upper limit value for the large delivery vehicle, an operation request for the large delivery vehicle is made. On the other hand, in a case where the total order weight value exceeds the mountable weight upper limit value for the large delivery vehicle, the alert is displayed to the user having the highest total weight of the one or more items.

Alternatively, in a case where the total order volume value exceeds the mountable volume upper limit value for the delivery vehicle, a large delivery vehicle having a higher mountable volume upper limit value than the delivery vehicle may be selected. In this case, the weight/volume calculation unit 14*e* determines whether or not the total order volume value exceeds the mountable volume upper limit value for the large delivery vehicle. In a case where the total order volume value is equal to or less than the mountable volume upper limit value for the large delivery vehicle, the operation request for the large delivery vehicle is made. On the other hand, in a case where the total order volume value exceeds the mountable volume upper limit value for the large delivery vehicle, the alert is displayed to the user having the highest total weight of the one or more items.

Moreover, the display processing unit 14*c* displays an "IMMEDIATE DELIVERY" button 921, a "TIME DESIGNATED DELIVERY" button 922, and a "SHARED DELIVERY" button 923 for selecting the delivery timing in the delivery timing selection area 92. By selecting any delivery timing in the delivery timing selection area 92, selection of the delivery timing is received by the user instruction reception unit 14*b*. The delivery timing may be selected by, for example, the representative in the group. Here, the "immediate delivery" is a delivery that takes place as soon as possible in relation to other orders. Each of the other orders is an order by another group or an order by an individual user. The "time designated delivery" is a delivery in which the one or more items arrive in a delivery time zone designated by the user. In a case where the "time designated delivery" is selected, a delivery time zone designation field is displayed, and the user can designate the delivery time zone in the designation field.

The "shared delivery" is a delivery (that is, a delivery in the same service) by the same delivery vehicle as that for one or more items related to another order. In a case where the "shared delivery" is selected, the delivery is performed in a case where the sum of the total order weight value related to the current order and the total order weight value related to the other order becomes the mountable weight upper limit value for the delivery vehicle or the mountable weight lower than the mountable weight upper limit value by a predetermined value. Alternatively, in a case where the "shared delivery" is selected, the delivery is performed in a case where the sum of the total order volume value related to the current order and the total order volume value related to the other order becomes the mountable volume upper limit value for the delivery vehicle or a mountable volume lower than the mountable volume upper limit value by a predetermined value. The "shared delivery" is more likely to take time for the one or more items related to the order to arrive at the delivery destination than the "immediate delivery", but the delivery fee required per delivery is lower.

Figure 9:
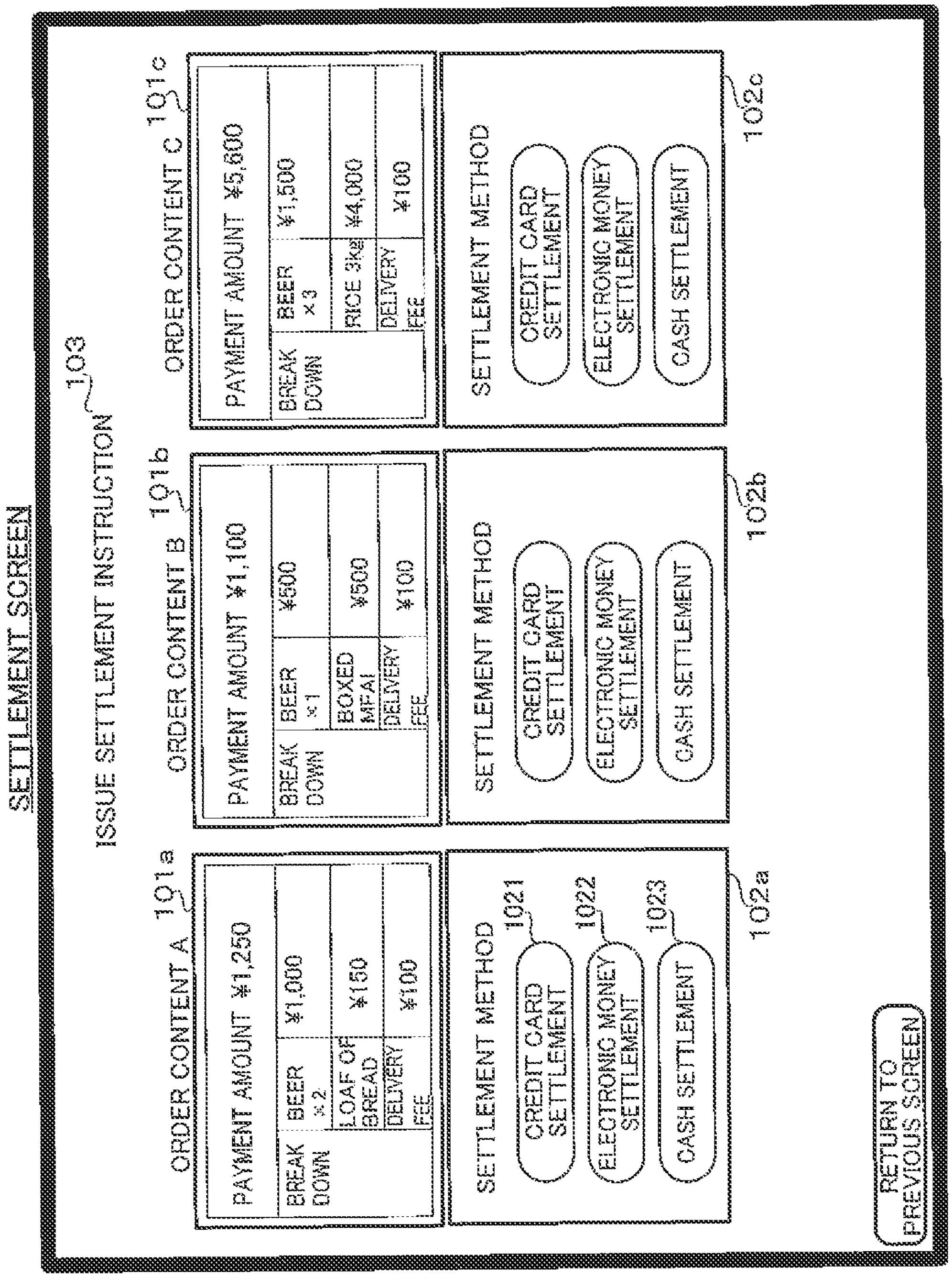
FIG. 9 is a diagram illustrating a display example of an settlement screen (common screen).

Moreover, the display processing unit 14*c* displays information prompting the settlement instruction of the one or more items related to the order on the settlement screen (screen for the user to order the one or more items). FIG. 9 is a diagram illustrating a display example of the settlement screen (common screen). The settlement screen illustrated in FIG. 9 is displayed, for example, by pressing a "TO ORDER" button 94 provided on the order content confirmation screen illustrated in FIG. 8. The settlement screen illustrated in FIG. 9 is provided with payment amount confirmation areas 101*a* to 101*c*, settlement method selection areas 102*a* to 102*c*, and the like, and displays information 103 prompting the settlement instruction of the one or more items related to the order.

The payment amount confirmation areas 101*a* to 101*c* are set corresponding to as many users as the number of ordering persons, respectively. For example, the display processing unit 14*c* displays, separately for each of the users in the group, payment amounts (order amounts) related to orders of the one or more items sorted for each of the users in the group and breakdowns thereof in the payment amount confirmation areas 101*a* to 101*c* as the information regarding settlement of the one or more items related to the order. Here, the payment amount (for example, a tax-inclusive price) includes the prices of the one or more items sorted for each of the users in the group and the delivery fee allocated to each of the users. As a result, each of the users in the group can easily grasp the prices and the delivery fee of the one or more items related to the order. Incidentally, in a case where there are a plurality of items related to the order for each of the users, the item price is a total price obtained by adding the prices of the respective items.

Moreover, the delivery fee is calculated by the delivery fee allocation unit 14*f* and is allocated to each of the users in the group. In the example in FIG. 9, the delivery fee allocation unit 14*f* equally divides the delivery fee (300 yen) required for each delivery by the number of ordering persons, and allocates the equally divided delivery fee (100 yen) to each of the users in the group. As a result, a cost burden related to the delivery can be fair among the plurality of users in the group. The delivery fee required for each delivery may be fixedly set, or may be set to vary according to the order content. For example, the delivery fee allocation unit 14*f* sets the delivery fee required for each delivery to be lower as the total order weight value is closer to the mountable weight upper limit value for the delivery vehicle. Alternatively, the delivery fee allocation unit 14*f* sets the delivery fee required for each delivery to be lower as the total order volume value is closer to the mountable volume upper limit value for the delivery vehicle.

Alternatively, the delivery fee required for each delivery may be set to vary according to the selected delivery timing. For example, the delivery fee is set to be the highest in the case of the "immediate delivery" and lowest in the case of the "shared delivery". Alternatively, the delivery fee required for each delivery may be set to vary according to the loading capacity (for example, the mountable weight upper limit value or the mountable volume upper limit value) of the delivery vehicle. For example, the delivery fee in the case of selecting the large delivery vehicle described above is set to be higher than the delivery fee in the case of selecting a delivery vehicle other than the large delivery vehicle.

Moreover, instead of equally dividing the delivery fee required for each delivery by the number of ordering persons and allocating the delivery fee to each of the users, the delivery fee allocation unit 14*f* may calculate different delivery fees for the plurality of users in the group on the basis of the order contents of the respective users in the group and allocate the delivery fees to the respective users. As a result, the cost burden related to the delivery can further be fair among the plurality of users in the group according to the order contents of the respective users in the group. For example, the delivery fee allocation unit 14*f* allocates a higher delivery fee to a user with a higher total price of the one or more items related to the order, so that the cost burden related to the delivery can further be fair among the users according to the total prices.

Moreover, the delivery fee allocation unit **14*f* allocates a higher delivery fee to a user with a larger quantity of the one or more items related to the order, so that the cost burden related to the delivery can further be fair among the users according to the quantities. Moreover, the delivery fee allocation unit 14*f* allocates a higher delivery fee to a user with a higher total weight of the one or more items related to the order, so that the cost burden related to the delivery can further be fair among the users according to the total weights. Moreover, the delivery fee allocation unit 14*f* allocates a higher delivery fee to a user with a higher total volume of the one or more items related to the order, so that the cost burden related to the delivery can further be fair among the users according to the total volumes. Alternatively, the delivery fee allocation unit 14*f*** may allocate a higher delivery fee to a user whose at least two or more of the total price, the quantity, the total weight, and the total volume of the one or more items related to the order are higher.

Moreover, in a case where a first user (for example, the user a and the user b) in which the total weight of the one or more items sorted for each of the users in the group does not exceed the upper limit value of the total weight of one or more items orderable per person and a second user (for example, the user c) in which the total weight of the one or more items sorted for each of the users in the group exceeds the upper limit value of the total weight of one or more items orderable per person are included in the plurality of users in the group, the delivery fee allocation unit **14*f*** may allocate a first delivery fee that is a part of the delivery fee required for each delivery to the first user and allocate a second delivery fee that is a part of the delivery fee required for each delivery and higher than the first delivery fee to the second user. As a result, since the user c can be made to pay the higher delivery fee than the other users a and b, the cost burden related to the delivery can further be fair among the plurality of users in the group. For example, in a case where the delivery fee required for each delivery is "300 yen", "80 yen" is allocated to each of the user a and the user b, who are the first users, and "140 yen" is allocated to the user c, who is the second user.

Moreover, in a case where a first user in which the total volume of the one or more items sorted for each of the users in the group does not exceed the upper limit value of the volume of one or more items orderable per person and a second user in which the total volume of the one or more items sorted for each of the users in the group exceeds the upper limit value of the volume of one or more items orderable per person are included in the plurality of users in the group, the delivery fee allocation unit **14*f*** may allocate a first delivery fee that is a part of the delivery fee required for each delivery to the first user and allocate a second delivery fee that is a part of the delivery fee required for each delivery and higher than the first delivery fee to the second user. As a result, the cost burden related to the delivery can further be fair among the plurality of users in the group.

The settlement method selection areas **102*a* to 102*c* illustrated in FIG. 9 are set corresponding to as many users as the number of ordering persons, respectively. The display processing unit 14*c* displays, separately for each of the users in the group, a "CREDIT CARD SETTLEMENT" button 1021, an "ELECTRONIC MONEY SETTLEMENT" button 1022, and a "CASH SETTLEMENT" button 1023 for selecting the settlement method (payment method) in the settlement method selection areas 102*a* to 102*c*. Incidentally, in the settlement method selection areas 102*a* to 102*c*, buttons for selecting a settlement method (for example, a point settlement) other than the credit card settlement, the electronic money settlement, and the cash settlement may be displayed. By selecting any settlement method in each of the settlement method selection areas 102*a* to 102*c*, selection of the settlement method is received by the user instruction reception unit 14*b***. The selection of the settlement method is preferably performed, for example, by each of the users in the group. That is, the payment is preferably made by each of the users.

Here, in a case where the credit card settlement or the electronic money settlement is selected, a screen (not illustrated) for communicating with the settlement IC chip is displayed on the display by the screen display control unit **14*a*. When the settlement card or the mobile terminal on which the settlement IC chip is mounted is inserted or held over the reader/writer by the user in the group and an order button provided on the screen is pressed, the settlement instruction of the items related to the order is received by the user instruction reception unit 14*b* (in other words, the order is received). As a result, settlement information (for example, a name, a card number, and an expiration date) necessary for the credit card settlement or the electronic money settlement is acquired from the settlement IC chip via the reader/writer by the control unit 14. In the case of the credit card settlement, there is a case where input of a personal identification number is required, and the user inputs the personal identification number. Then, the available amount of the credit card settlement is acquired from the center server 2** via the communication network NW by authorization on the basis of the settlement information necessary for the credit card settlement. As another example, a preset available amount may be acquired from the settlement IC chip without the authorization.

Alternatively, a balance of electronic money is acquired from the center server 2 via the communication network NW on the basis of the settlement information necessary for the electronic money settlement. Incidentally, the balance of the electronic money may be acquired from the settlement IC chip. On the other hand, in a case where the cash settlement is selected, a screen (not illustrated) for inserting cash into the cash reception mechanism is displayed on the display by the screen display control unit **14*a*. Then, when the cash is inserted into the cash reception mechanism and the order button provided on the screen is pressed by the user in the group, the settlement instruction of the items related to the order is received by the user instruction reception unit 14*b*. As a result, cash insertion information is acquired by the control unit 14**.

In response to the received settlement instruction, the settlement processing unit **14*g* performs settlement processing of performing the settlement for the one or more items sorted for each of the users in the group per user on the basis of the payment amount (that is, the payment amount per user) related to the order of the one or more items sorted for each of the users in the group. That is, the settlement processing unit 14*g* performs settlement for the sorted items for each of as many users as the designated number of the users. As a result, each of the users in the group can grasp the payment amount (that is, the payment amount related to the order of the one or more items instructed to be selected and sorted) related to the order and easily make payment (adjust an account). For example, each of the users in the group grasps each payment amount and gives the settlement instruction or the like to pay the payment amount on the order reception & processing terminal 1, whereby the payment can easily be performed. Alternatively, the representative in the group grasps the respective payment amounts, gives the respective settlement instructions or the like to temporarily bear the respective payment amounts on the order reception & processing terminal 1**, and then collects the payment amounts from the respective users, whereby the payment can easily be performed.

In a case where the credit card settlement is selected and the available amount is acquired in the settlement method selection areas 102*a* to 102*c*, the settlement processing unit 14*g* determines, for example, whether or not the payment amount related to the order is equal to or less than the available amount in the settlement processing. The settlement processing unit 14*g* authorizes the payment in a case of determining that the payment amount related to the order is equal to or less than the available amount. Moreover, in a case where the electronic money settlement is selected and the balance of the electronic money is acquired in the settlement method selection areas 102*a* to 102*c*, the settlement processing unit 14*g* determines, for example, whether or not the payment amount related to the order is equal to or less than the balance of the electronic money in the settlement processing. In a case of determining that the payment amount related to the order is equal to or less than the balance of the electronic money, the settlement processing unit 14*g* subtracts the payment amount from the balance and authorizes the payment. Moreover, in a case where the cash settlement is selected and the cash insertion information is acquired in the settlement method selection areas 102*a* to 102*c*, the settlement processing unit 14*g* determines, for example, whether or not the payment amount related to the order is equal to or less than the cash indicated by the insertion information. In a case of determining that the payment amount related to the order is equal to or less than the cash, the settlement processing unit 14*g* gives change (i.e., performs change refund processing) as necessary and authorizes the payment.

When the settlement is completed by the settlement processing unit 14*g* authorizing the payment (that is, as many payments as the number of ordering persons) for each of the users in the group, order information is transmitted from the order reception & processing terminal 1 to the center server 2 via the communication network NW. Here, the order information includes the identifier of the order reception & processing terminal 1, information (for example, the identifier and the quantity of each item) regarding the one or more items sorted for each of the users in the group, the selected delivery timing (including the designated delivery time zone in the case of the "time designated delivery"), and the like. Such order information may include the operation request for the large delivery vehicle. Incidentally, in a case where the credit card settlement or the electronic money settlement is selected, the settlement processing may be performed by the center server 2. In this case, the order information includes the settlement information acquired from the settlement IC chip and the payment amount (that is, the payment amount per user) related to the order of the one or more items sorted for each of the users in the group, in addition to the information related to the one or more items sorted for each of the users in the group.

Meanwhile, the item selection screen, the item sorting screen, the item selection & sorting screen, the order content confirmation screen, and the settlement screen described above are the common screens commonly used by the plurality of users in the group, but as another example, dedicated screens (an item selection screen, an order content confirmation screen, and a settlement screen) used exclusively by each of the users in the group may be displayed. In this case, the screen display control unit 14*a* displays the item selection screen, the order content confirmation screen, and the settlement screen separately for each user as many times as the number of ordering persons. In this manner, since the respective dedicated screens are displayed separately for each of the users, it is possible to sort and display the one or more items selected on the item selection screen for each of as many users as the number of ordering persons without the need for the aforementioned sorting instruction.

Figure 10:
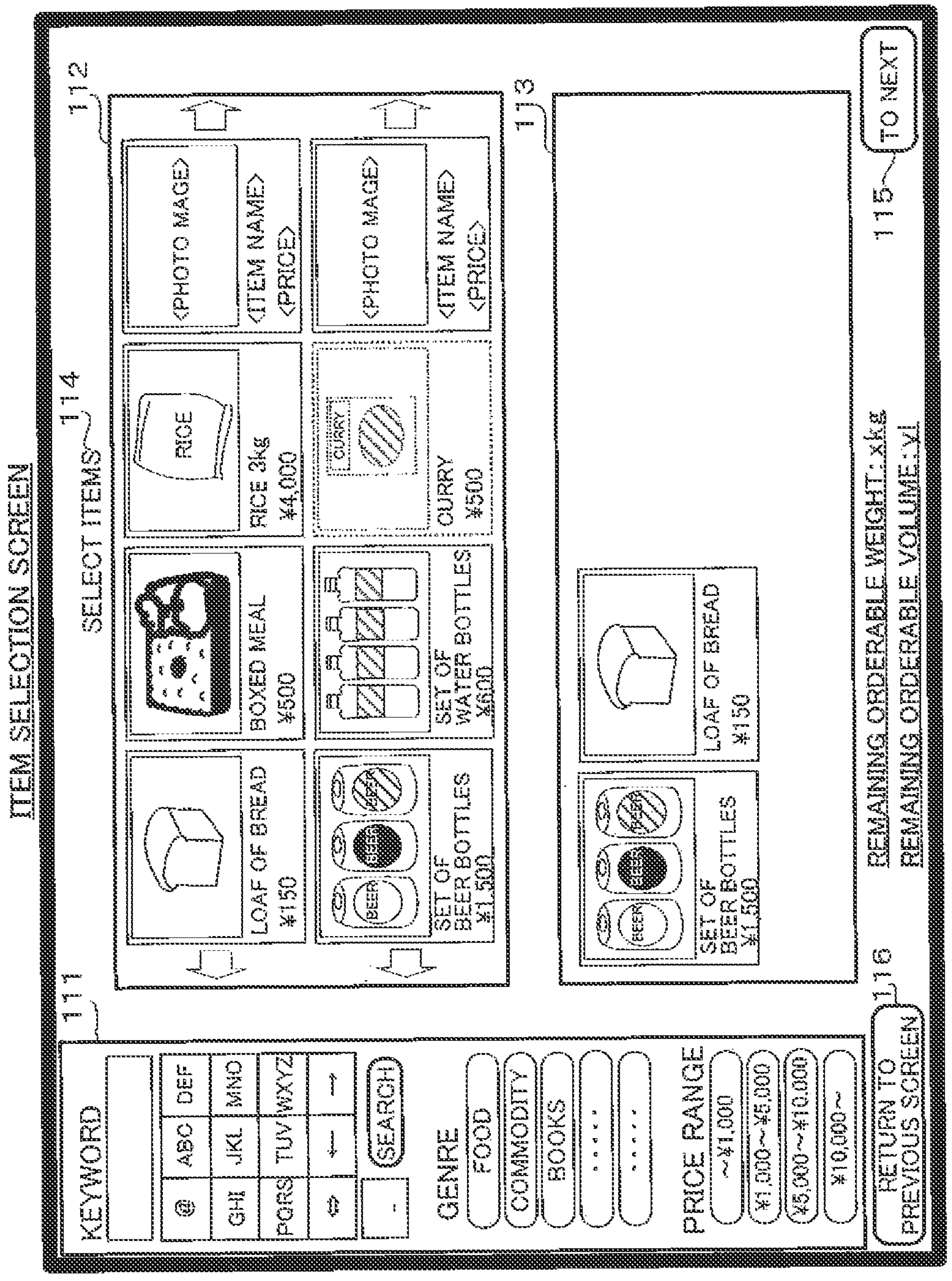
FIG. 10 is a diagram illustrating a display example of an item selection screen (dedicated screen).
Figure 11:
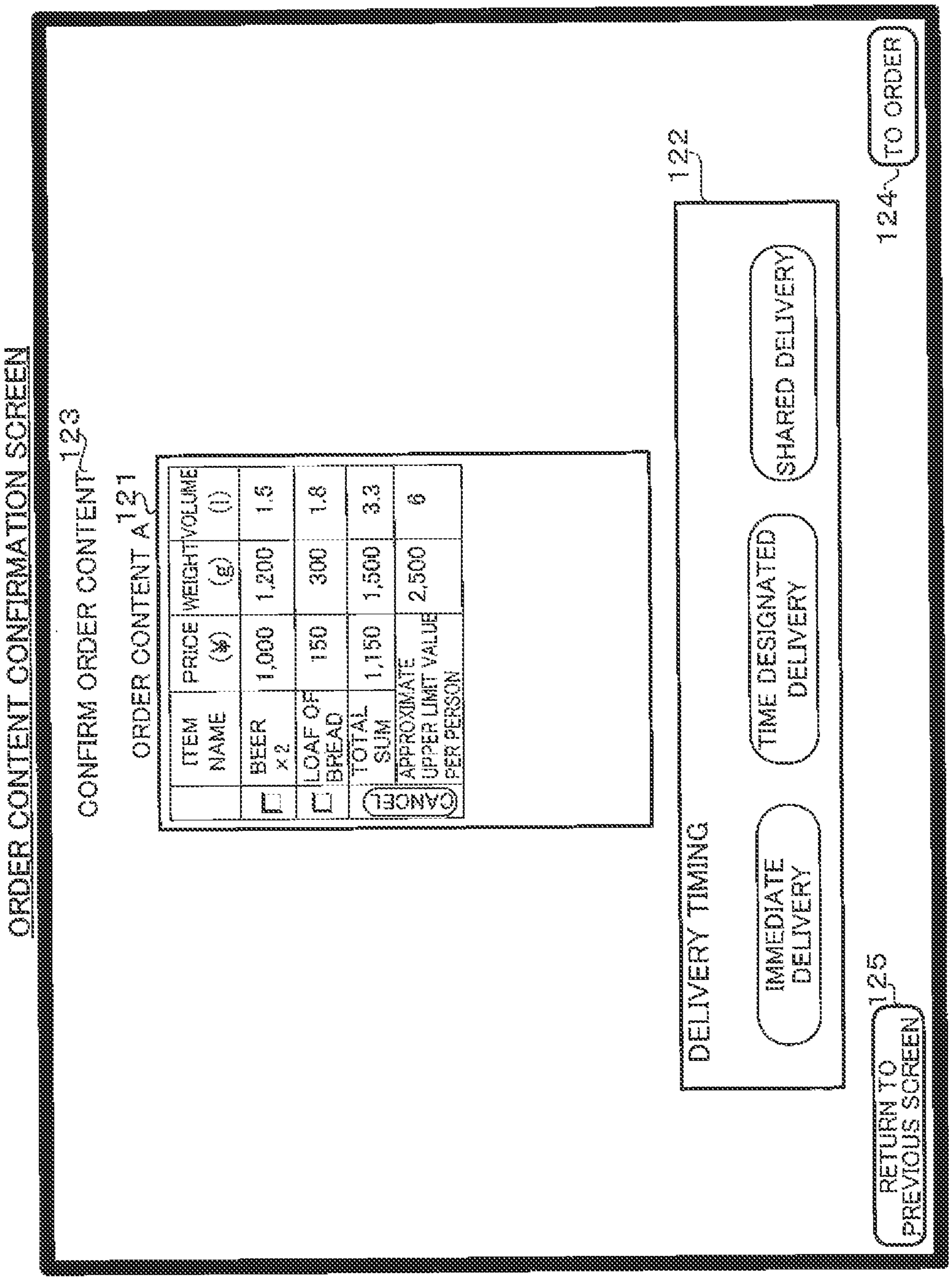
FIG. 11 is a diagram illustrating a display example of an order content confirmation screen (dedicated screen).
Figure 12:
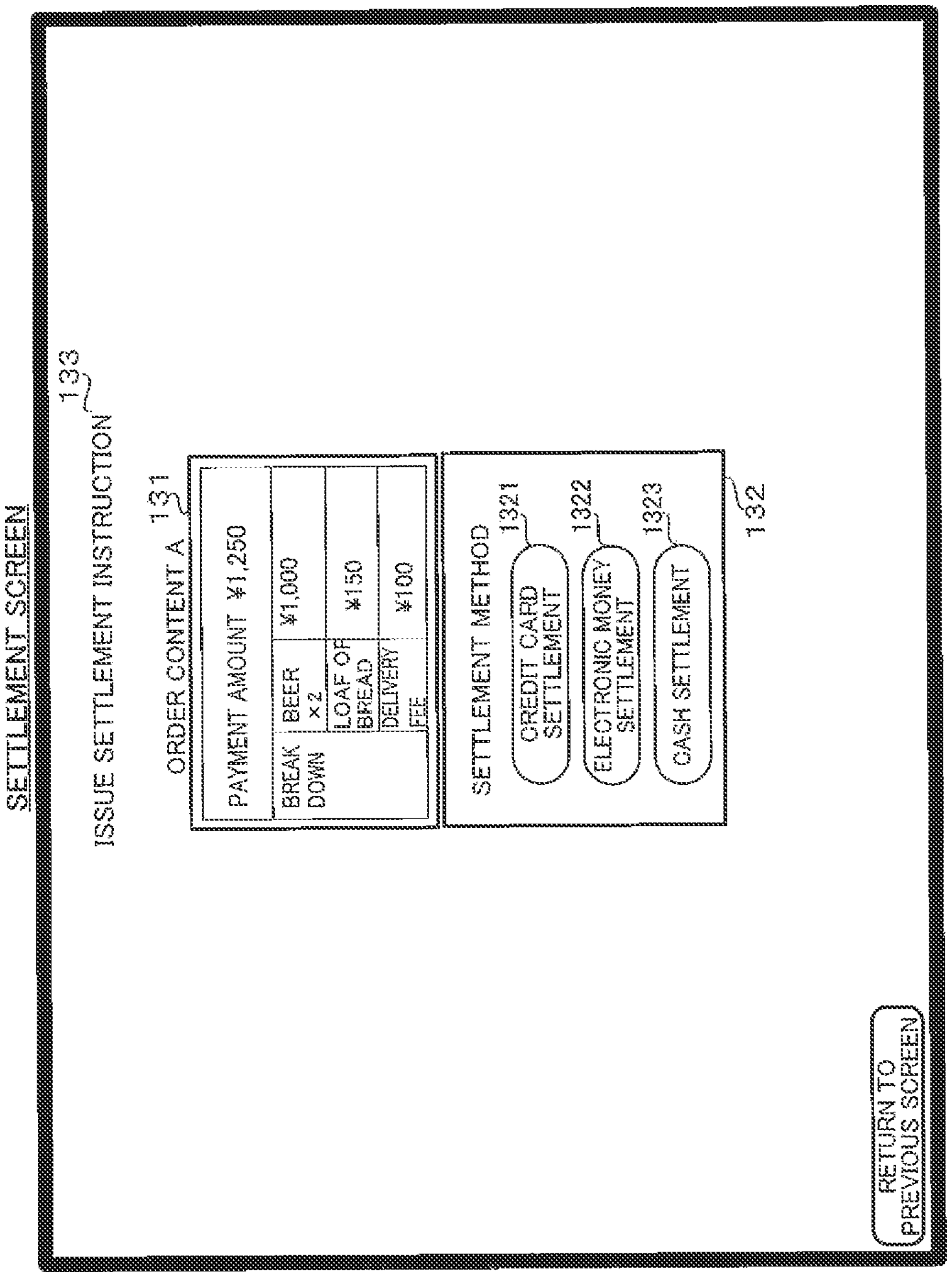
FIG. 12 is a diagram illustrating a display example of an settlement screen (dedicated screen).

FIG. 10 is a diagram illustrating a display example of the item selection screen (dedicated screen of the user a), FIG. 11 is a diagram illustrating a display example of the order content confirmation screen (dedicated screen of the user a), and FIG. 12 is a diagram illustrating a display example of the settlement screen (dedicated screen of the user a). Incidentally, in a case where the user b and the user c are included in the group, the dedicated screens of the user b and the dedicated screens of the user c are displayed similarly to FIGS. 10 to 12. The item selection screen illustrated in FIG. 10 is provided with a search condition designation area 111, a selection option item display area 112, a selected item display area 113, and the like, and displays information 114 prompting the item selection.

When the one or mores item related to the order is selected from the plurality of items in the selection option item display area 112 by the user a, the item selection is received by the user instruction reception unit 14*b* similarly to the item selection screen illustrated in FIG. 5. The display processing unit 14*c* displays, for example, the names, the prices, and the photographic images of the items in a selected item display area 113 as information regarding the selected items. For example, when the user a completes the selection of the one or more items and presses a "NEXT" button 115 provided on the item selection screen illustrated in FIG. 10, the item selection screen that is a dedicated screen of the user b is displayed on the display. When the selection of the one or more items is completed by each of the plurality of users in the group, the order content confirmation screen illustrated in FIG. 11 is displayed on the display.

The order content confirmation screen illustrated in FIG. 11 is provided with an order content confirmation area 121, a delivery timing selection area 122, and the like, and displays information 123 prompting confirmation of the order content. The display processing unit 14*c* displays the names, prices, weights, and volumes of the items sorted for the user a in the order content confirmation area 121. Moreover, the display processing unit 14*c* displays at least one of a set including an upper limit value of a weight of one or more items orderable per person and a total weight of the one or more items sorted for the user a and a set including an upper limit value of a volume of one or more items orderable per person and a total volume of the one or more items sorted for the user a in the order content confirmation area 121. Then, for example, when the user a completes confirmation of the payment content, the settlement screen of the user a is displayed on the display. Incidentally, the delivery timing in the delivery timing selection area 122 is only required to be selected on the order content confirmation screen of any user in the group.

The settlement screen illustrated in FIG. 12 is provided with a payment amount confirmation area 131, a settlement method selection area 132, and the like, and displays information 133 prompting the settlement instruction of the one or more items related to the order. The display processing unit 14*c* displays the payment amount related to the order of the one or more items sorted for the user a and the breakdown thereof in the payment amount confirmation area 131.

In the settlement method selection area 132, for example, in a case where the credit card settlement or the electronic money settlement is selected by the user a, a screen (not illustrated) for communicating with the settlement IC chip is displayed on the display, similarly to the settlement screen illustrated in FIG. 9.

Then, when the settlement card or the mobile terminal on which the settlement IC chip is mounted is inserted or held over the reader/writer by the user a and an order button provided on the screen is pressed, the settlement instruction of the one or more items related to the order is received by the user instruction reception unit 14*b*. That is, the order is received for each screen. As a result, in the settlement in a case where the plurality of persons simultaneously place orders, each of the users in the group can prevent information regarding the selected one or more items, personal information regarding the settlement, and the like from being known to other users as much as possible, and the risk of leakage of the personal information can be reduced.

In response to the settlement instruction received by the user instruction reception unit 14*b*, the settlement processing unit 14*g* performs settlement processing of performing the settlement for the one or more items sorted for the user a on the basis of the payment amount related to the order of the one or more items sorted for the user a. As a result, each of the users in the group can grasp the payment amount (that is, the payment amount related to the order of the selected one or more items) related to the order and easily make payment. When the payment is authorized by the settlement processing unit 14*g* and the settlement is completed, the order content confirmation screen that is a dedicated screen of the user b is displayed. Then, when the user b completes confirmation of the payment content, the settlement screen of the user b is displayed on the display, and the settlement instruction of the one or more items related to the order is received by the user instruction reception unit 14*b*. Then, in response to the received settlement instruction, the settlement processing unit 14*g* performs settlement processing of performing the settlement of the one or more items sorted for the user b on the basis of the payment amount related to the order of the one or more items sorted for the user b. That is, the settlement is performed for the one or more items sorted for each user for each order received through each screen. Incidentally, when the settlement is completed by authorizing the payment of each of the plurality of users in the group, order information is transmitted from the order reception & processing terminal 1 to the center server 2 via the communication network NW.

[1-2. Configuration and Function of Center Server 2]

Figure 13:
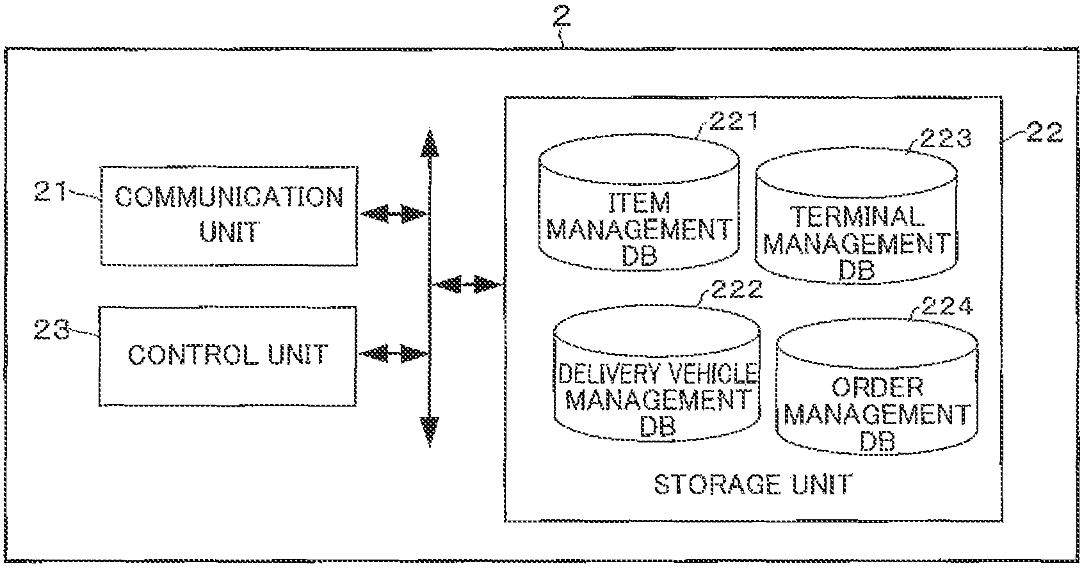
FIG. 13 is a diagram illustrating a schematic configuration example of a center server 2.

Next, a configuration and a function of the center server 2 will be described with reference to FIG. 13. FIG. 13 is a diagram illustrating a schematic configuration example of the center server 2. As illustrated in FIG. 13, the center server 2 includes a communication unit 21, a storage unit 22, a control unit 23, and the like. The communication unit 21 controls communication performed via the communication network NW. Incidentally, the center server 2 can communicate with a credit card settlement management server, an electronic money settlement management server, and the like via the communication unit 21. The storage unit 22 includes, for example, a hard disk drive, and stores an operating system and various programs including an order processing application (application that defines an order processing method) program. Moreover, in the storage unit 22, an item management database (DB) 221, a delivery vehicle management database (DB) 222, a terminal management database (DB) 223, an order management database (DB) 224, and the like are constructed.

The item management database 221 is a database for managing the items. In the item management database 221, for example, the identifier, the name, the genre, the price, the weight, the volume, the size, the photographic image, a stock quantity, positional information (for example, latitude and longitude) of an item storage base, and the like of each item are associated with one another per item and stored. Here, the item storage base may be provided in a plurality of regions.

The delivery vehicle management database 222 is a database for managing the delivery vehicles. In the delivery vehicle management database 222, for example, an identifier, the loading capacity, an operating state, an available time zone, positional information of a delivery vehicle standby base, and the like of each delivery vehicle are associated with one another per delivery vehicle and stored. The operating state indicates whether the delivery vehicle is being operated (for example, moving for delivery preparation, being used for delivery, or returning) or in a standby state, and is updated as appropriate. The available time zone indicates a date and a time zone in which the delivery vehicle is available for delivery. The delivery vehicle standby base may be provided in a plurality of regions. In the delivery vehicle standby base, for example, a plurality of delivery vehicles (normally operating delivery vehicles) and one large delivery vehicle are preferably arranged. Incidentally, the delivery vehicle standby base may be in the item storage base.

The terminal management database 223 is a database for managing the order reception & processing terminal 1. In the terminal management database 223, for example, the identifier, positional information (for example, latitude and longitude) of an installation place, and the like of the order reception & processing terminal 1 are associated with one another per order reception & processing terminal 1 and stored. The order management database 224 is a database for managing the orders. In the order management database 224, for example, an identifier of each order, an order reception date and time, an order type, the identifier of each item related to the order, the quantity of the item, positional information of the delivery destination, a delivery plan (including a schedule) of the item related to the order, and the like are associated with one another per order and stored. Here, the order type indicates the group order or the individual order. The delivery plan indicates which delivery vehicle is to be loaded with the item related to the order, what time the delivery vehicle leaves the item storage base, and what time the delivery vehicle returns after stopping by the delivery destination. Information related to the delivery plan includes, for example, a scheduled delivery start (departure) time, a scheduled delivery destination arrival time, a scheduled delivery end (return) time, the identifier of the delivery vehicle used for delivery, and the like.

The control unit 23 includes at least one CPU, a ROM, a RAM, and the like. The CPU (an example of processor) is configured to access the program code stored in the ROM or the storage unit 22 and operate as instructed by the program code. The program code includes: fifth reception code configured to cause the CPU to receive, from a first terminal used for the designation of the number of the users and the selection of the one or more items, via communication network NW, a first order with a place where the first terminal is installed or a neighborhood thereof as a delivery destination of the one or more items, sixth reception code configured to cause the CPU to receive, from a second terminal used for the selection of the one or more items by a user other than the plurality of users, via The communication network NW, a second order with a delivery destination designated on the second terminal, and determination code configured to cause the CPU to determine a delivery plan of the one or more items related to the group order such that the delivery plan is implemented in preference to a delivery plan of the one or more items related to the individual order.

Figure 14:
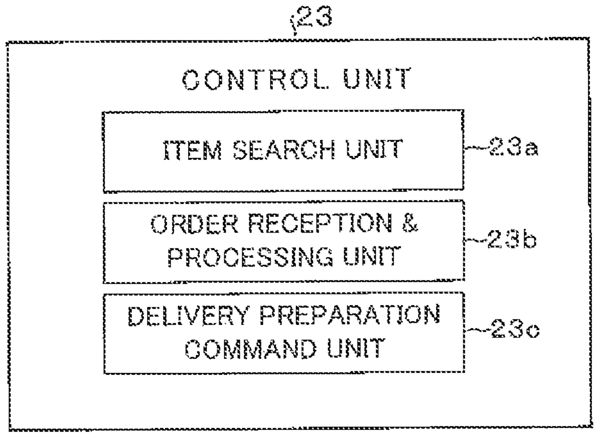
FIG. 14 is a diagram illustrating an example of functional blocks in a control unit 23.

FIG. 14 is a diagram illustrating an example of functional blocks in the control unit 23. The control unit 23 manages a delivery preparation task using a delivery preparation task management table. The delivery preparation task is, for example, determination of the delivery plan and loading work of the items onto the delivery vehicle. When an order is received, the identifier of the order, the order reception date and time, the order type, and a delivery preparation start flag are registered in the delivery preparation task table in association with each other. The delivery preparation start flag is set to “0” by default, and when the delivery preparation task is started (that is, delivery preparation is started), the delivery preparation start flag is changed to “1”.

Here, a start order of the delivery preparation task is basically order of registration in the delivery preparation task table. However, in a case where a group order whose delivery timing is the “immediate delivery” is received, the identifier and the like of the group order are registered in the delivery preparation task table such that the delivery preparation task is started earlier than an individual order whose delivery preparation start flag is “0” out of the already registered individual orders (that is, such that the start order of the individual order is skipped). That is, in a case where the “immediate delivery” is selected in the group order via the order reception & processing terminal 1, the group order is prioritized over the individual order whose delivery preparation start flag is “0” out of the already registered individual orders via the user terminal. As a result, the delivery plan of the one or more items related to the group order whose delivery timing is the “immediate delivery” is determined in preference to the delivery plan of the one or more items related to the individual order. Here, the delivery plan of the one or more items related to the group order is, hereinbelow, referred to as a “the delivery plan of the group order”. The delivery plan of the one or more items related to the individual order is, hereinbelow, referred to as a “the delivery plan of the individual order”.

Moreover, as illustrated in FIG. 14, the control unit 23 functions as an item search unit 23*a*, an order reception & processing unit 23*b*, a delivery preparation command unit 23*c*, and the like according to the order processing application program (program code group) stored in, for example, the ROM or the storage unit 22. Incidentally, the order reception & processing unit 23*b* may function as the settlement processing unit 14*g*. The item search unit 23*a* acquires the search query from the order reception & processing terminal 1 via the communication network NW and the communication unit 21. The item search unit 23*a* searches the item management database 221 for one or more items in stock that satisfy the search condition included in the search query, and transmits the search result including information regarding the searched one or more items to the order reception & processing terminal 1 via the communication network NW by means of the communication unit 21.

The order reception & processing unit 23*b* acquires order information from the order reception & processing terminal 1 or the user terminal via the communication network NW and the communication unit 21 to receive an order (group order or individual order), and issues the identifier of the order. Here, the individual order provides the delivery destination designated on the user terminal. For example, the order information from the user terminal includes the positional information of the delivery destination designated by the individual user. Then, the order reception & processing unit 23*b* registers the order reception date and time, the order type, the identifier and the quantity of each of the one or more items included in the order information, and the positional information of the delivery destination in the order management database 224 in association with the identifier of the order. Here, the delivery destination in the case of the group order is the installation place of the order reception & processing terminal 1 or the vicinity of the installation place. On the other hand, the delivery destination in the case of the individual order is the delivery destination designated by the individual user on the user terminal.

Furthermore, the order reception & processing unit 23*b* registers the identifier of the order, the order reception date and time, the order type, and the delivery preparation start flag “0” in the delivery preparation task table in association with each other. Incidentally, as described above, in a case where the group order is received, the identifier and the like of the group order are registered in the delivery preparation task table so that the delivery preparation task for the group order is started earlier than that for the individual order already registered. The order reception & processing unit 23*b* determines the delivery plan of the one or more items related to the order with the earliest start order of the delivery preparation task among the orders with the delivery preparation start flag of “0” in the delivery preparation task table. Information regarding the delivery plan thus determined is registered in the order management database 224 in association with the identifier of the order.

The order reception & processing unit 23*b* determines the delivery plan of the group order such that the delivery plan of the group order (whose delivery timing is the “immediate delivery”) is implemented in preference to the delivery plan of the individual order. As a result, since the one or more items related to the group order from the installation-type order reception & processing terminal 1 can be delivered in preference to the one or more items related to the individual order from the user terminal, the one or more items related to the group order from the order reception & processing terminal 1 can be delivered quickly to each of the users in the group. This is because, in a case where the “immediate delivery” is selected using the installation-type order reception & processing terminal 1, delivery in a shorter time is required since the delivery destination is the installation place of the order reception & processing terminal 1 or the vicinity of the installation place. This is also based on a delivery policy that the delivery using the user terminal allows the individual user to freely designate the delivery destination (for example, home), and thus does not need to be prioritized over the order using the order reception & processing terminal 1 even in a case where the “immediate delivery” is selected. When the determination of the delivery plan of the one or more items related to the order is completed, the delivery preparation start flag of the order is changed to “1”, and the delivery plan of the one or more items related to the order of the next turn is determined.

Here, the delivery plan of the one or more items related to the order is determined by selecting one of the plurality of delivery vehicles on the basis of the delivery timing included in the order information, the available time zone of each of the plurality of delivery vehicles in the delivery vehicle management database 222, and the like, and setting at least a scheduled delivery start time and a scheduled delivery end time (desirably, a scheduled delivery start time, a scheduled delivery destination arrival time, and a scheduled delivery end time) of the selected delivery vehicle.

For example, in a case where the delivery timing is the “immediate delivery”, the order reception & processing unit 23*b* selects, for example, a delivery vehicle that can “depart earliest from the current time (the processing time point), arrive at the delivery destination, and return” in the available time zone, and sets at least the scheduled delivery start time and the scheduled delivery end time of the selected delivery vehicle. At this time, the delivery vehicle is preferably selected from the delivery vehicles in the delivery vehicle standby base within a predetermined distance range from the delivery destination of the one or more items related to the order (the same applies to the cases of the “time designated delivery” and the “shared delivery” described below). The available time zone of the delivery vehicle selected in this manner is updated and changed to a zone after the scheduled delivery end time in the delivery vehicle management database 222. Incidentally, in a case where the order information includes the operation request for the large delivery vehicle, the large delivery vehicle that can “depart earliest from the current time, arrive at the delivery destination, and return” in the available time zone is selected, and at least the scheduled delivery start time and the scheduled delivery end time of the selected large delivery vehicle are set.

On the other hand, in a case where the delivery timing is the “time designated delivery” (in a case where a designated delivery time zone is included in the order information), the order reception & processing unit 23*b* selects a delivery vehicle that can “depart, arrive at the delivery destination in the designated delivery time zone earliest, and return” in the available time zone, for example, and sets at least the scheduled delivery start time and the scheduled delivery end time of the selected delivery vehicle. The available time zone of the delivery vehicle selected in this manner is updated and changed to a zone before the scheduled delivery start time or a zone after the scheduled delivery end time in the delivery vehicle management database 222. Incidentally, in a case where the order information includes the operation request for the large delivery vehicle, the large delivery vehicle that can “depart, arrive at the delivery destination in the designated delivery time zone earliest, and return” in the available time zone is selected, and at least the scheduled delivery start time and the scheduled delivery end time of the selected large delivery vehicle are set.

On the other hand, in a case where the delivery timing is the “shared delivery”, the order reception & processing unit 23*b* selects, at a time when the sum of the total order weight value related to the current order and the total order weight value related to another order (for example, at least one of a pending order and an order received after the current order) becomes the mountable weight upper limit value for the delivery vehicle or a mountable weight lower than the mountable weight upper limit value by a predetermined value, a delivery vehicle that can “depart earliest from the time when the sum becomes the mountable weight upper limit value or the mountable weight, arrive at one or the plurality of delivery destinations, and return” in the available time zone, and sets at least the scheduled delivery start time and the scheduled delivery end time of the selected delivery vehicle. The available time zone of the delivery vehicle selected in this manner is updated and changed to a zone after the scheduled delivery end time in the delivery vehicle management database 222. Incidentally, in a case where the order information includes the operation request for the large delivery vehicle, at a time when the sum of the total order weight value related to the current order and the total order weight value related to another order becomes the mountable weight upper limit value for the delivery vehicle or a mountable weight lower than the mountable weight upper limit value by a predetermined value, a large delivery vehicle that can “depart earliest from the time when the sum becomes the mountable weight upper limit value or the mountable weight, arrive at one or the plurality of delivery destinations, and return” in the available time zone is selected, and at least the scheduled delivery start time and the scheduled delivery end time of the selected large delivery vehicle is set.

The delivery preparation command unit 23*c* transmits delivery preparation command information including the information regarding the delivery plan determined by the order reception & processing unit 23*b*, the identifiers, the names, the quantities, and the delivery destination of the one or more items related to the order to, for example, a mobile terminal of a staff existing in the item storage base via the communication network NW by the communication unit 21. Upon receiving the delivery preparation command information, the staff's mobile terminal displays the delivery preparation command information on the display. As a result, the staff moves the delivery vehicle indicated in the delivery plan to an item loading place in the item storage base, and loads the one or more items related to the order into the delivery vehicle. When the scheduled delivery start time indicated in the delivery plan comes, the delivery vehicle starts delivery of the one or more items related to the order to the delivery destination. Moreover, the delivery preparation command unit 23*c* may transmit the delivery preparation command information including the information regarding the delivery plan determined by the order reception & processing unit 23*b*, the identifiers, the names, the quantities, and the delivery destination of the one or more items related to the order to the delivery vehicle indicated in the delivery plan via the communication network NW by the communication unit 21.

Incidentally, in a case where the order reception & processing unit 23*b* functions as the settlement processing code, the order reception & processing unit 23*b* may sort the selected items and perform settlement for the sorted items for each of as many users as the number of ordering persons on the basis of the settlement information included in the order information and the payment amount (that is, the payment amount for each user) related to the order. For example, the order reception & processing unit 23*b* acquires the available amount of the credit card settlement from the credit settlement management server via the communication network NW by authorization on the basis of the settlement information necessary for the credit card settlement. The order reception & processing unit 23*b* authorizes the payment in a case of determining that the payment amount related to the order is equal to or less than the available amount. Alternatively, the order reception & processing unit 23*b* acquires the balance of electronic money from the electronic money settlement management server via the communication network NW on the basis of the settlement information necessary for the electronic money settlement. In a case of determining that the payment amount related to the order is equal to or less than the balance of the electronic money, the order reception & processing unit 23*b* subtracts the payment amount from the balance and authorizes the payment. In a case where authorizing the payment of each of the plurality of users in the group, the order reception & processing unit 23*b* registers information such as the identifier of the order in the order management database 224 and the delivery preparation task table similarly to the above, and determines the delivery plan of the one or more items related to the order.

[2. Operation of Order Processing System S]

Figure 15:
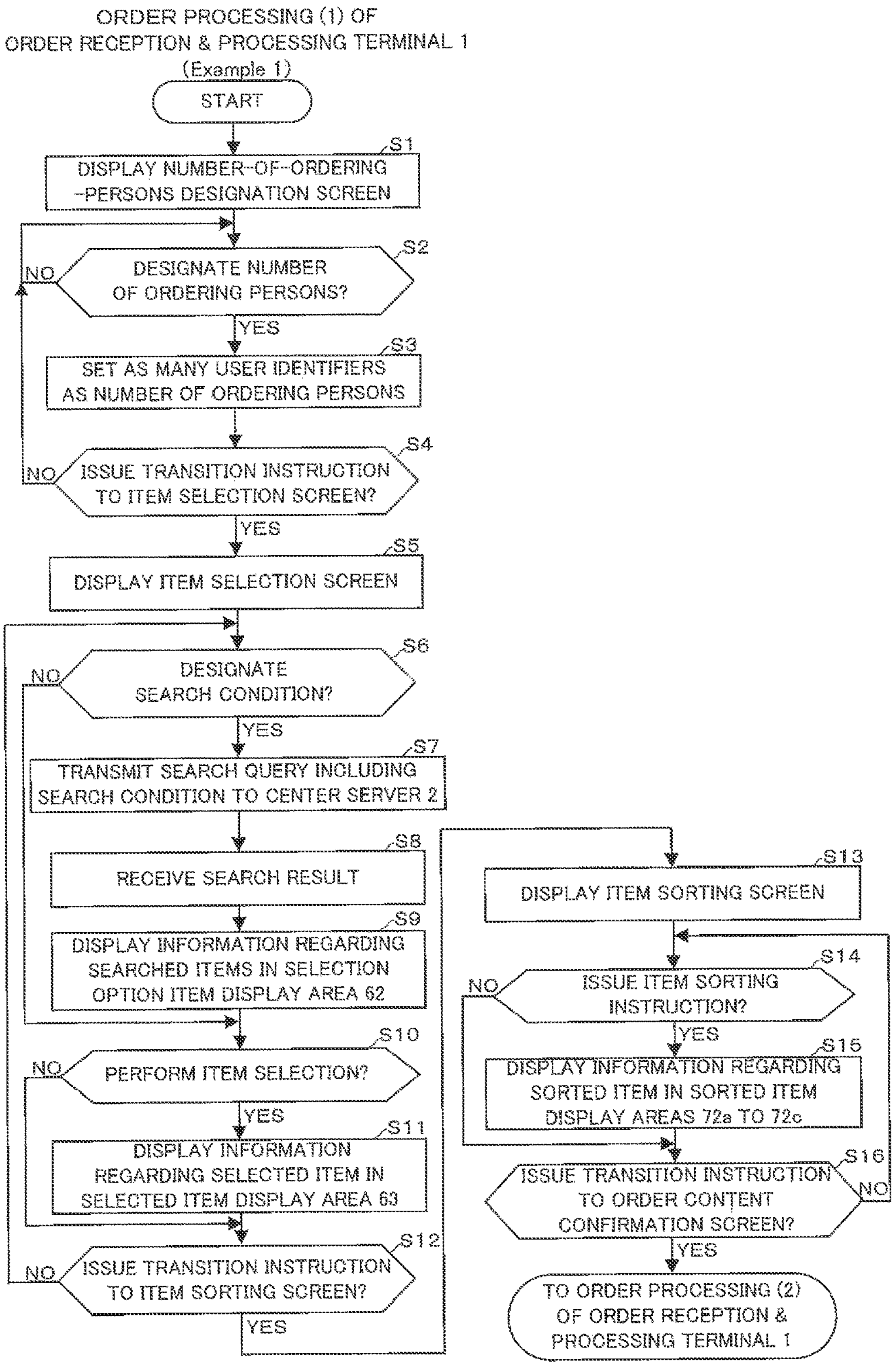
FIG. 15 is a flowchart illustrating an example of order processing (1) executed by the control unit 14 of the order reception & processing terminal 1 in Example 1.
Figure 16:
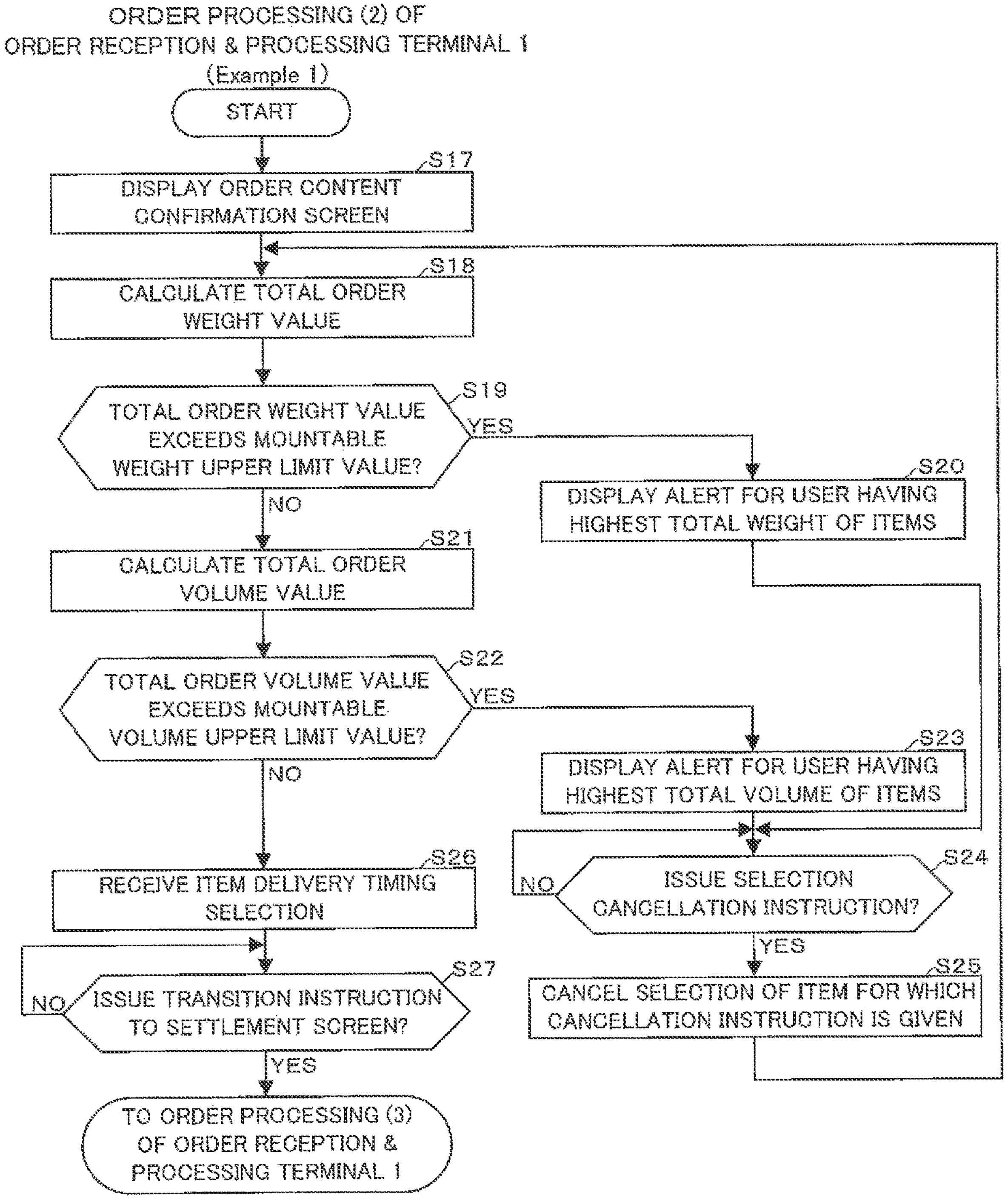
FIG. 16 is a flowchart illustrating an example of order processing (2) executed by the control unit 14 of the order reception & processing terminal 1 in Example 1.
Figure 17:
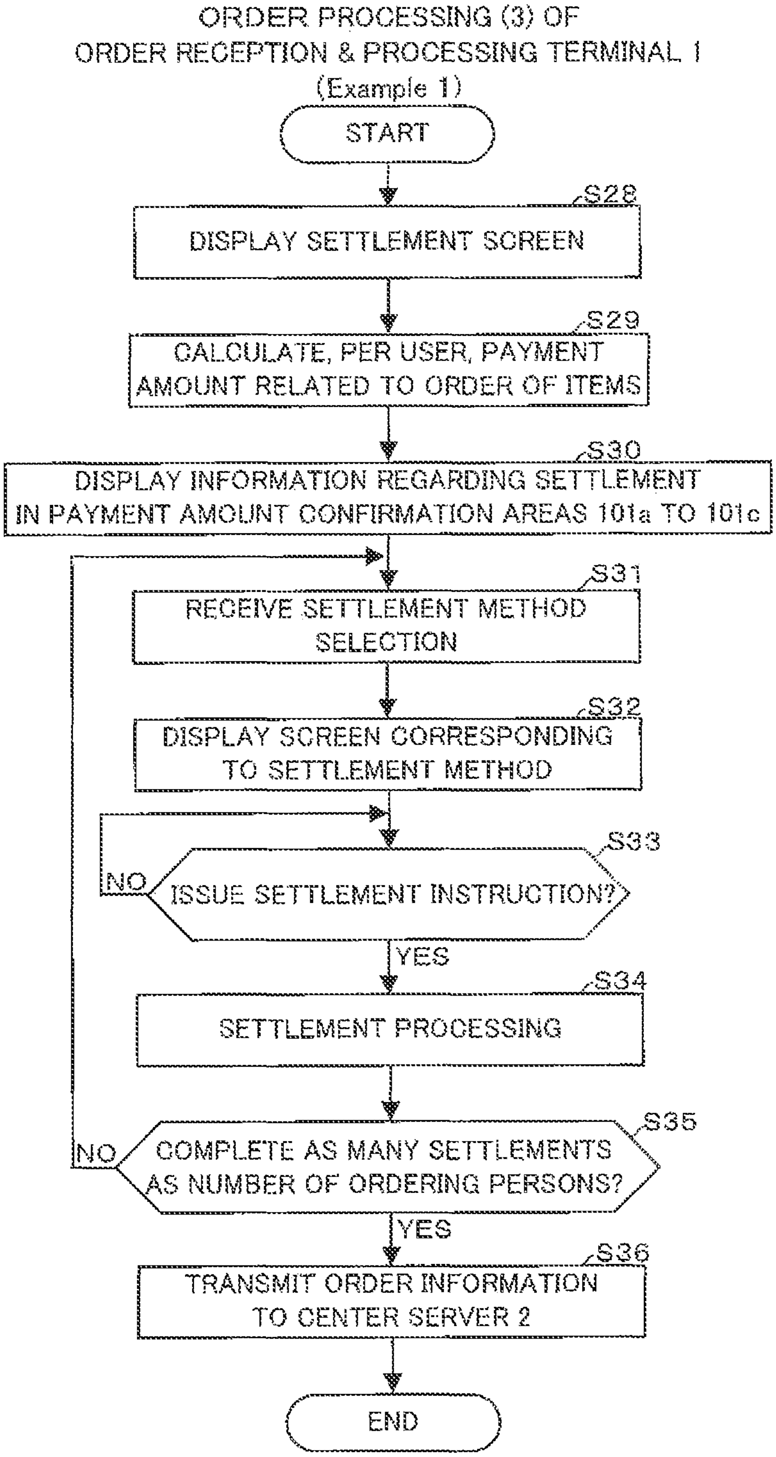
FIG. 17 is a flowchart illustrating an example of order processing (3) executed by the control unit 14 of the order reception & processing terminal 1 in Example 1.
Figure 18A:
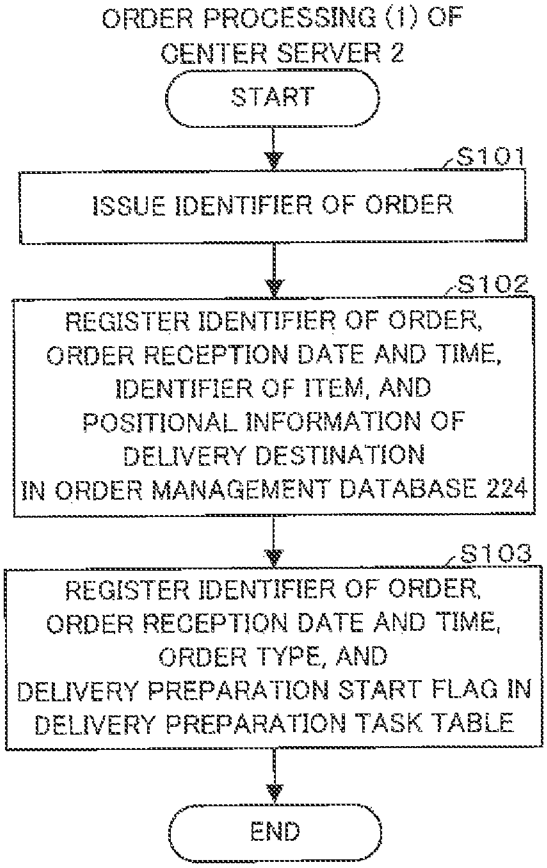
FIG. 18A is a flowchart illustrating an example of order processing (1) executed by the control unit 23 of the center server 2 in Examples 1 to 3.
Figure 18B:
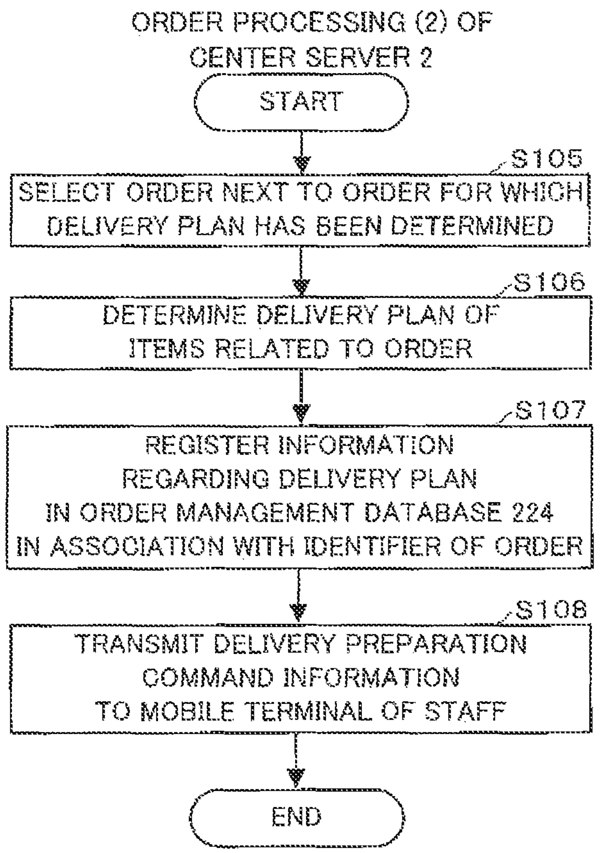
FIG. 18B is a flowchart illustrating an example of order processing (2) executed by the control unit 23 of the center server 2 in Examples 1 to 3.
Figure 19:
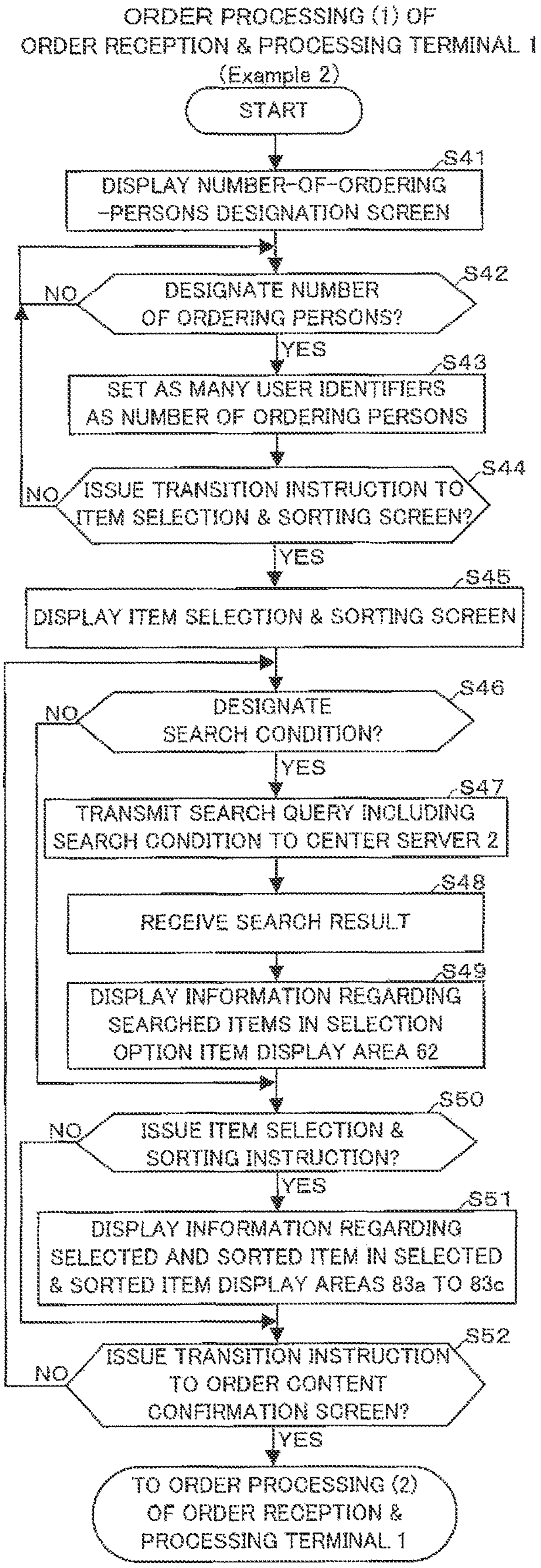
FIG. 19 is a flowchart illustrating an example of order processing (1) executed by the control unit 14 of the order reception & processing terminal 1 in Example 2.
Figure 20:
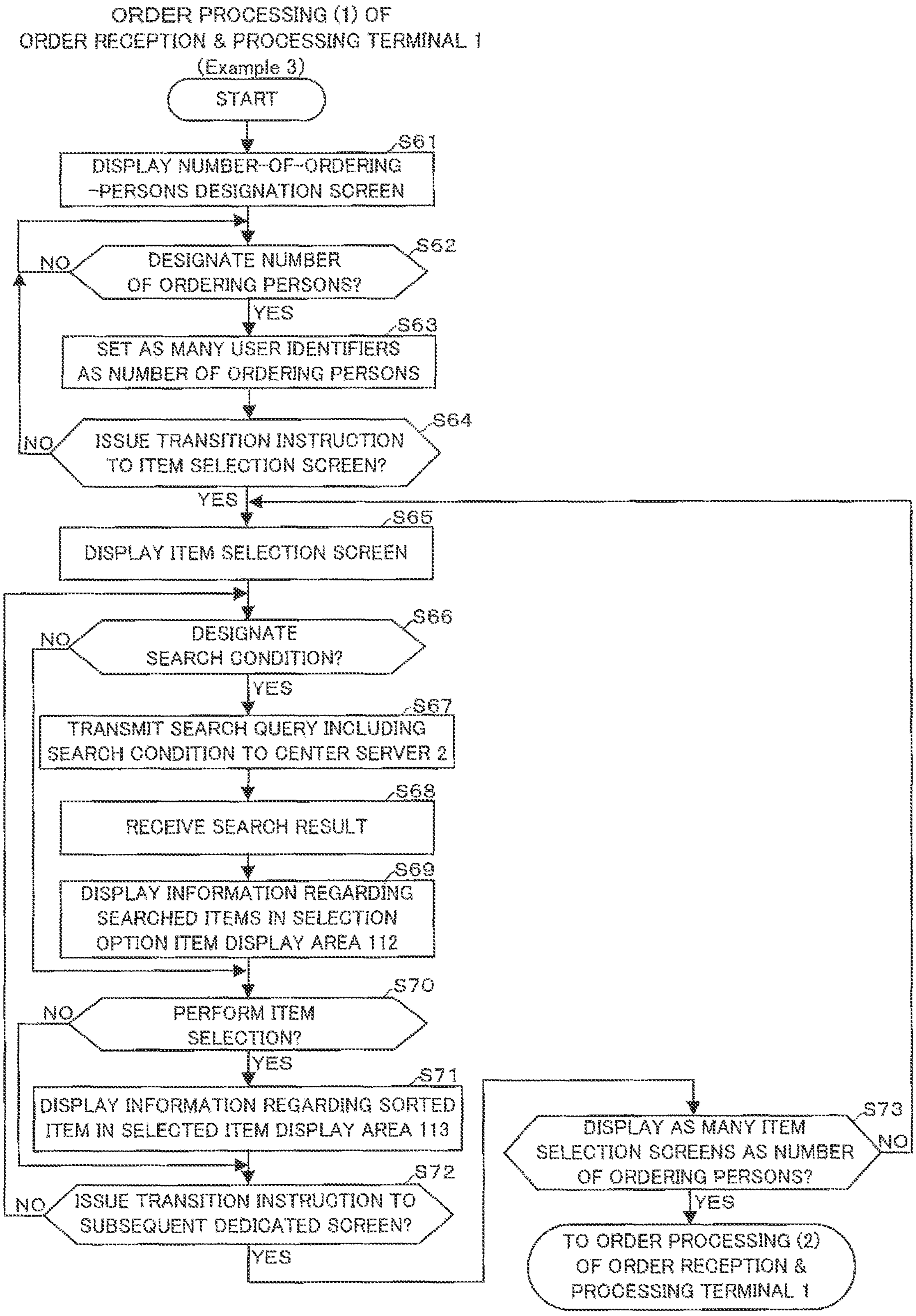
FIG. 20 is a flowchart illustrating an example of order processing (1) executed by the control unit 14 of the order reception & processing terminal 1 in Example 3.
Figure 21:
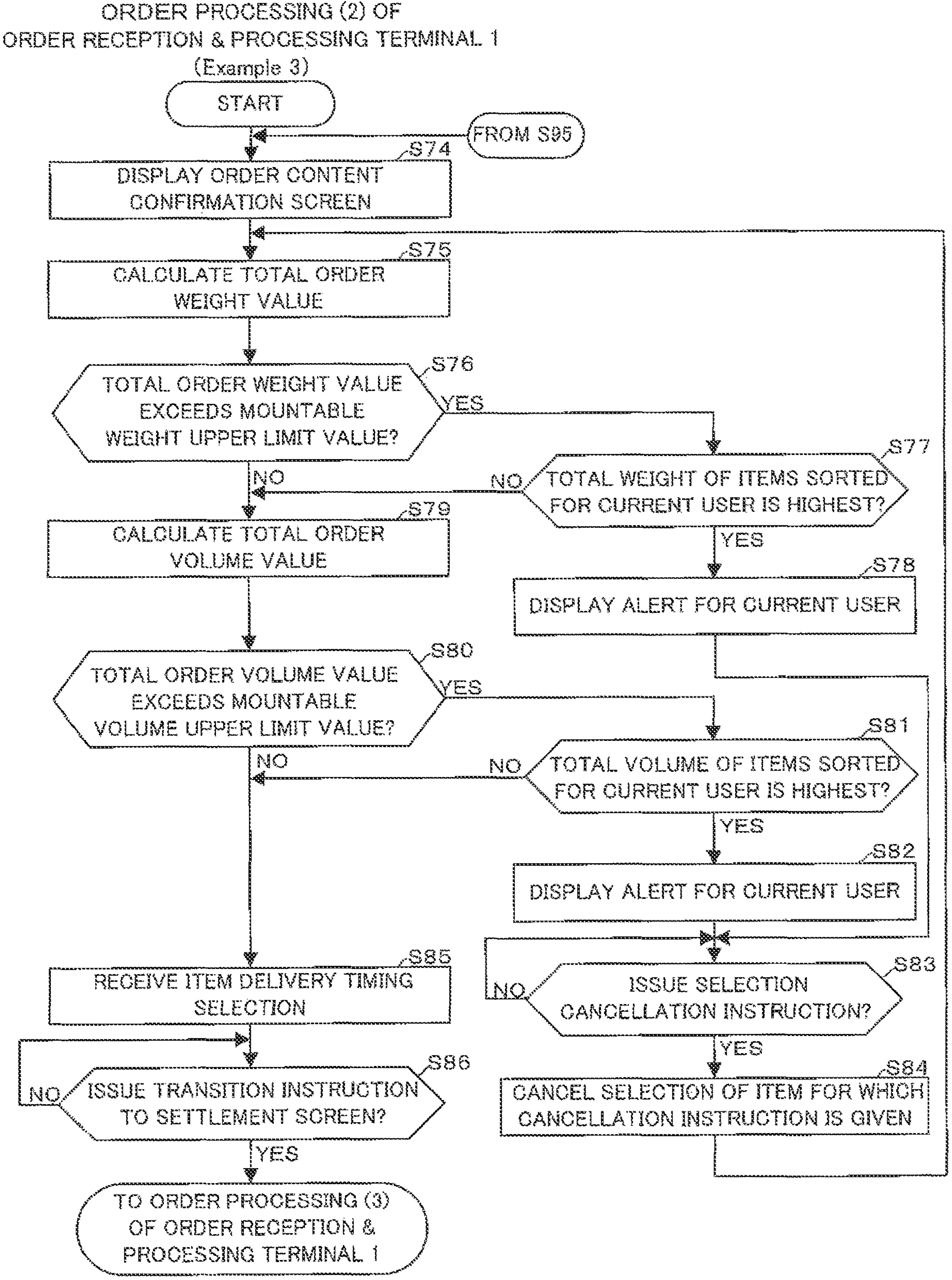
FIG. 21 is a flowchart illustrating an example of order processing (2) executed by the control unit 14 of the order reception & processing terminal 1 in Example 3.
Figure 22:
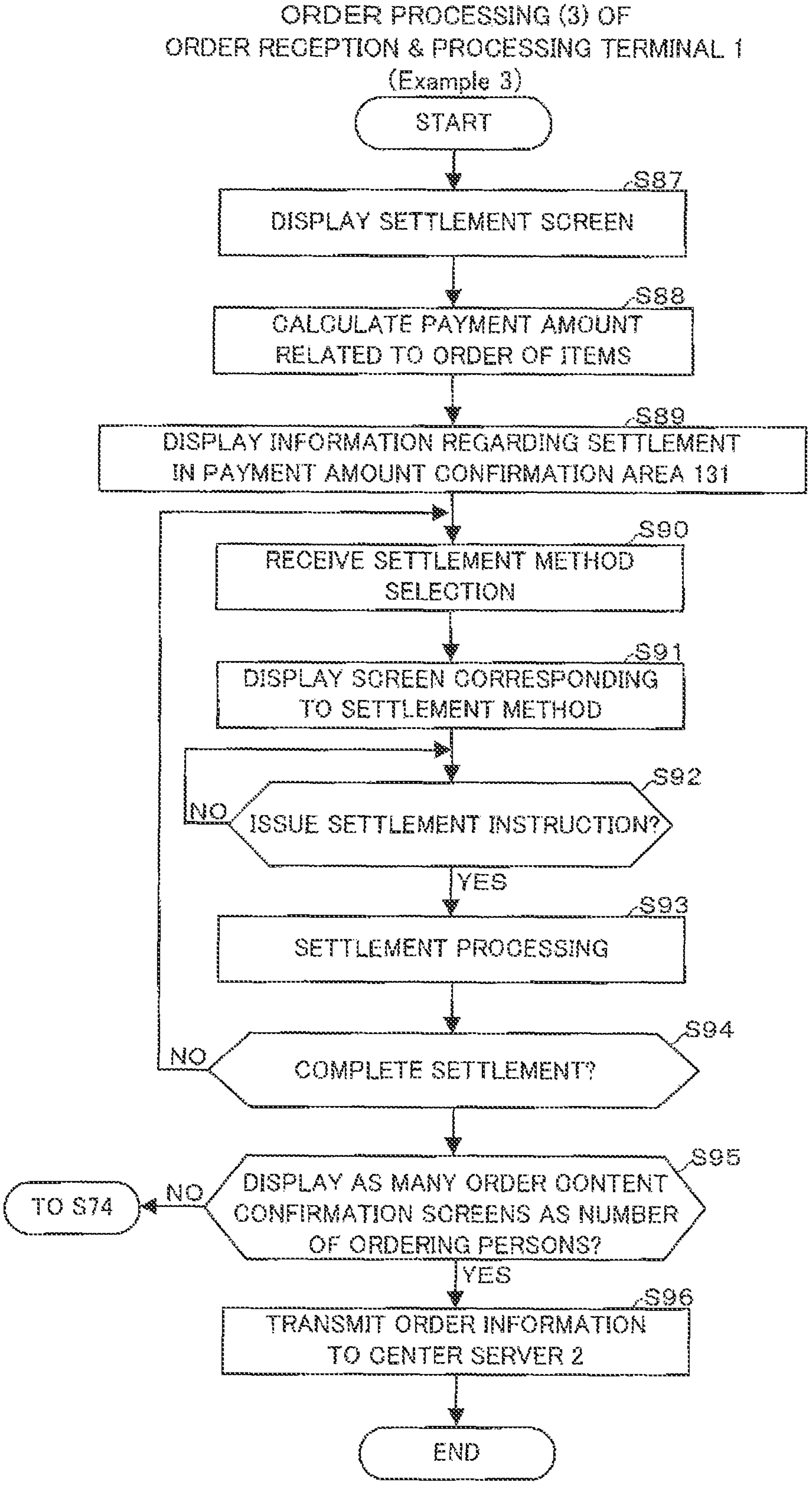
FIG. 22 is a flowchart illustrating an example of order processing (3) executed by the control unit 14 of the order reception & processing terminal 1 in Example 3.

Next, with reference to FIGS. 15 to 22, the operation of the order processing system S in a case where the order reception & processing terminal 1 is used for the order will be described separately in Examples 1 to 3. FIGS. 15 to 17 are flowcharts illustrating examples of order processing (1) to (3) executed by the control unit 14 of the order reception & processing terminal 1 in Example 1. FIGS. 18A and 18B are flowcharts illustrating examples of order processing (1) and (2) executed by the control unit 23 of the center server 2 in Examples 1 to 3. FIG. 19 is a flowchart illustrating an example of order processing (1) executed by the control unit 14 of the order reception & processing terminal 1 in Example 2. FIGS. 20 to 22 are flowcharts illustrating examples of order processing (1) to (3) executed by the control unit 14 of the order reception & processing terminal 1 in Example 3.

Example 1

First, the operation of the order processing system S in Example 1 will be described. Example 1 is an example of a case where the item selection and the item sorting instruction are performed at different time using the item selection screen (FIG. 5) and the item sorting screen (FIG. 6). First, in the order reception & processing terminal 1, order processing (1) illustrated in FIG. 15 is started when, for example, the representative of the plurality of users in the group presses an order start button (not illustrated) in the order reception & processing terminal 1. When order processing (1) illustrated in FIG. 15 is started, the control unit 14 causes the screen display control unit 14*a* to display the number-of-ordering-persons designation screen as illustrated in FIG. 4 on the display (step S1).

Subsequently, the control unit 14 determines whether or not designation of the number of ordering persons has been received (the number of ordering persons has been designated) (step S2). For example, when the number of ordering persons is input in the input field 512 in the number-of-ordering-persons designation area 51 illustrated in FIG. 4 and the "CONFIRMATION" button 513 is pressed, designation of the number of ordering persons is received by the user instruction reception unit 14*b*. In a case where it is determined that the designation of the number of ordering persons has been received (step S2: YES), as many user identifiers as the designated number of ordering persons are set (step S3), and the processing proceeds to step S4. On the other hand, in a case where it is determined that the designation of the number of ordering persons has not been received (step S2: NO), reception of the designation of the number of ordering persons is awaited. Incidentally, at this time, names (which may be nicknames) of as many users as the number of ordering persons may be input.

In step S4, the control unit 14 determines whether or not a transition instruction to the item selection screen has been received (a transition instruction to the item selection screen has been issued). For example, when the "TO ITEM SELECTION" button 53 illustrated in FIG. 4 is pressed, the transition instruction to the item selection screen is received by the user instruction reception unit 14*b*. In a case where it is determined that the transition instruction to the item selection screen has been received (step S4: YES), the processing proceeds to step S5. On the other hand, in a case where it is determined that the transition instruction to the item selection screen has not been received (step S4: NO), the processing returns to step S2.

In step S5, the control unit 14 causes the screen display control unit 14*a* to display the item selection screen as illustrated in FIG. 5 on the display. At this time, as described above, the display processing unit 14*c* may display the information regarding the item (for example, the recommended item) serving as the selection option in the selection option item display area 62.

Subsequently, the control unit 14 determines whether or not the designation of the search condition has been received (step S6). As described above, in a case where it is determined that the designation of the search condition has been received (step S6: YES), the processing proceeds to step S7. On the other hand, in a case where it is determined that the designation of the search condition has not been received (step S6: NO), the processing proceeds to step S10.

In step S7, the control unit 14 causes the communication unit 11 to transmit the search query including the designated search condition to the center server 2 via the communication network NW. In response to the search query, as described above, the item search unit 23*a* of the center server 2 searches for one or more items satisfying the search condition.

Then, a search result including information regarding the searched one or more items is transmitted from the center server 2 to the order reception & processing terminal 1 via the communication network NW. When receiving the search result from the center server 2 (step S8), the control unit 14 causes the display processing unit 14*c* to display information regarding the one or more items (searched items) indicated in the search result in the selection option item display area 62 (step S9), and advances the processing to step S10.

In step S10, the control unit 14 determines whether or not the item selection has been received (the item selection has been performed). For example, when the photographic image or the like of the item in the selection option item display area 62 illustrated in FIG. 5 is dragged and dropped to the selected item display area 63, the item selection is received. In a case where it is determined that the item selection has been received (step S10: YES), the display processing unit 14*c* displays the information regarding the selected item in the selected item display area 63 (step S11), and the processing proceeds to step S12. On the other hand, in a case where it is determined that the item selection has not been received (step S10: NO), the processing proceeds to step S12.

In step S12, the control unit 14 determines whether or not a transition instruction to the item sorting screen has been received. For example, when the "TO ITEM SORTING" button 65 illustrated in FIG. 5 is pressed, the transition instruction to the item sorting screen is received by the user instruction reception unit 14*b*.

Then, in a case where it is determined that the transition instruction to the item sorting screen has been received (step S12: YES), the processing proceeds to step S13. On the other hand, in a case where it is determined that the transition instruction to the item sorting screen has not been received (step S12: NO), the processing returns to step S6. Incidentally, in a case where it is determined that the transition instruction to the item sorting screen has not been received, for example, in a case where a "RETURN TO PREVIOUS SCREEN" button 66 illustrated in FIG. 5 is designated, the number-of-ordering-persons designation screen is displayed again.

In step S13, the control unit 14 causes the screen display control unit 14*a* to display the item sorting screen as illustrated in FIG. 6 on the display, and causes the display processing unit 14*c* to display the information regarding the selected one or more items in the selected item display area 71 as described above.

Subsequently, the control unit 14 determines whether or not the item sorting instruction has been received (step S14). For example, when the photographic image or the like of the item in the selected item display area 71 illustrated in FIG. 6 is dragged and dropped to any one or more of the sorted item display areas 72*a* to 72*c*, the item sorting instruction is received. In a case where it is determined that the item sorting instruction has been received (step S14: YES), the one or more items instructed to be sorted is sorted to any one of the users by the sorting processing unit 14*d*, and information regarding the sorted one or more items is displayed in any one or more of the sorted item display areas 72*a* to 72*c* by the display processing unit 14*c* (step S15), and the processing proceeds to step S16. On the other hand, in a case where it is determined that the item sorting instruction has not been received (step S14: NO), the processing proceeds to step S16.

In step S16, the control unit 14 determines whether or not a transition instruction to the order content confirmation screen has been received. For example, when the "TO ORDER CONTENT CONFIRMATION" button 74 illustrated in FIG. 6 is pressed, the transition instruction to the order content confirmation screen is received by the user instruction reception unit 14*b*. Incidentally, in a case where each of the items instructed to be selected and sorted is not sorted into any of as many users as the number of ordering persons (in other words, in a case where the information regarding the one or more items instructed to be selected and sorted is not displayed in any of the sorted item display areas 72*a* to 72*c*), the "TO ORDER CONTENT CONFIRMATION" button 74 cannot be pressed.

Then, in a case where it is determined that the transition instruction to the order content confirmation screen has been received (step S16: YES), the processing proceeds to order processing (2) illustrated in FIG. 16. On the other hand, in a case where it is determined that the transition instruction to the order content confirmation screen has not been received (step S16: NO), the processing returns to step S14 (accordingly, sorting of the selected one or more items can be corrected). Incidentally, in a case where it is determined that the transition instruction to the order content confirmation screen has not been received, for example, in a case where the "RETURN TO PREVIOUS SCREEN" button 75 illustrated in FIG. 6 is designated, the item selection screen is displayed again.

When order processing (2) illustrated in FIG. 16 is started, in step S17, the control unit 14 causes the screen display control unit 14*a* to display the order content confirmation screen as illustrated in FIG. 8 on the display, and causes the display processing unit 14*c* to display the information regarding the sorted one or more items in the order content confirmation areas 91*a* to 91*c* separately for each of the users in the group as described above. At this time, as illustrated in FIG. 8, the display processing unit 14*c* preferably displays the set including the upper limit value of the weight of one or more items orderable per person and the total weight of the one or more items sorted for each of the users in the group and the set including the upper limit value of the volume of one or more items orderable per person and the total volume of the one or more items sorted for each of the users in the group in the order content confirmation areas 91*a* to 91*c*.

Subsequently, as described above, the control unit 14 causes the weight/volume calculation unit 14*e* to calculate the total order weight value (step S18). Subsequently, the control unit 14 determines whether or not the total order weight value calculated in step S18 exceeds the mountable weight upper limit value for the delivery vehicle (step S19). In a case where it is determined that the total order weight value has exceeded the mountable weight upper limit value for the delivery vehicle (step S19: YES), the alert is displayed for the user having the highest total weight of the sorted one or more items as illustrated in FIG. 8 (step S20), and the processing proceeds to step S24. On the other hand, in a case where it is determined that the total order weight value does not exceed the mountable weight upper limit value for the delivery vehicle (step S19: NO), the processing proceeds to step S21.

In step S21, as described above, the control unit 14 causes the weight/volume calculation unit 14*e* to calculate the total order volume value. Subsequently, the control unit 14 determines whether or not the total order volume value calculated in step S21 exceeds the mountable volume upper limit value for the delivery vehicle (step S22). In a case where it is determined that the total order volume value exceeds the mountable volume upper limit value for the delivery vehicle (step S22: YES), the alert is displayed for the user having the highest total volume of the sorted one or more items (step S23), and the processing proceeds to step S24. On the other hand, in a case where it is determined that the total order volume value does not exceed the mountable volume upper limit value for the delivery vehicle (step S22: NO), the processing proceeds to step S26.

In step S24, the control unit 14 determines whether or not the item selection cancellation instruction has been received (the selection cancellation instruction has been issued). In a case where it is determined that the item selection cancellation instruction is received (step S24: YES), the selection of the item for which the cancellation instruction is given is canceled (step S25). Then, the information regarding the item is deleted from any of the order content confirmation areas 91*a* to 91*c*, and the processing returns to step S18. On the other hand, in a case where the item selection cancellation instruction is not received (step S24: NO), reception of the item selection cancellation instruction is awaited.

Incidentally, even in a case where the total order volume value does not exceed the mountable weight upper limit value for the delivery vehicle and the order volume total value does not exceed the mountable volume upper limit value for the delivery vehicle (that is, in a case where the alert is not displayed), the selection of the item may be canceled in response to the item selection cancellation instruction.

In step S26, the control unit 14 receives the item delivery timing selection. For example, when any one of the "IMMEDIATE DELIVERY" button 921, the "TIME DESIGNATED DELIVERY" button 922, and the "SHARED DELIVERY" button 923 in the delivery timing selection area 92 illustrated in FIG. 8 is pressed, the item delivery timing selection is received by the user instruction reception unit 14*b*.

Subsequently, the control unit 14 determines whether or not a transition instruction to the settlement screen (order content confirmation instruction) has been received (a transition instruction to the settlement screen has been issued) (step S27). For example, when the "TO ORDER" button 94 illustrated in FIG. 8 is pressed, the transition instruction to the settlement screen is received by the user instruction reception unit 14*b*.

Then, in a case where it is determined that the transition instruction to the settlement screen has been received (step S27: YES), the processing proceeds to order processing (3) illustrated in FIG. 17. On the other hand, in a case where it is determined that the transition instruction to the settlement screen has not been received (step S27: NO), the processing returns to step S27. Incidentally, in a case where it is determined that the transition instruction to the settlement screen has not been received, for example, in a case where a “RETURN TO PREVIOUS SCREEN” button 95 illustrated in FIG. 8 is designated, the item sorting screen is displayed again.

When order processing (3) illustrated in FIG. 17 is started, in step S28, the control unit 14 causes the screen display control unit 14*a* to display the settlement screen as illustrated in FIG. 9 on the display. Subsequently, the control unit 14 calculates, per user, the payment amount related to the order of the one or more items sorted for each of the users in the group (step S29). In calculating the payment amount, the delivery fee allocation unit 14*f* calculates the delivery fee for each of the users in the group as described above, and allocates the calculated delivery fee to each of the users.

Subsequently, the control unit 14 causes the display processing unit 14*c* to display the information (including the calculated payment amount) regarding the settlement of the one or more items related to the order in the payment amount confirmation areas 101*a* to 101*c* separately for each of the users in the group as described above (step S30). Subsequently, the control unit 14 receives the settlement method selection (step S31). For example, when any one of the “CREDIT CARD SETTLEMENT” button 1021, the “ELECTRONIC MONEY SETTLEMENT” button 1022, and the “CASH SETTLEMENT” button 1023 in any one of the settlement method selection areas 102*a* to 102*c* illustrated in FIG. 9 is pressed, the settlement method selection is received by the user instruction reception unit 14*b*.

Subsequently, the control unit 14 causes the screen display control unit 14*a* to display a screen (not illustrated) corresponding to the settlement method selected in step S31 on the display (step S32). For example, in a case where the credit card settlement or the electronic money settlement is selected, the screen for communicating with the settlement IC chip is displayed as described above. On the other hand, in a case where the cash settlement is selected, the screen for inserting cash into the cash reception mechanism is displayed.

Subsequently, the control unit 14 determines whether or not the settlement instruction of the one or more items related to the order has been received (the settlement instruction has been issued) (step S33). For example, when the order button provided on the screen displayed in step S32 is pressed, the user instruction reception unit 14*b* receives the settlement instruction of the one or more items related to the order. In a case where it is determined that the settlement instruction of the one or more items related to the order has been received (step S33: YES), the processing proceeds to step S34. On the other hand, in a case where it is determined that the settlement instruction of the one or more items related to the order has not been received (step S33: NO), reception of the settlement instruction from any of the users in the group is awaited.

In step S34, on the basis of the payment amount related to the order of the user who has given the settlement instruction received in step S33, the control unit 14 performs the settlement processing of performing settlement for the one or more items sorted for the user by the settlement processing unit 14*g* as described above. In this manner, the settlement processing is performed for each of the plurality of users in the group. Incidentally, in the settlement processing, the payment is authorized or not authorized.

Subsequently, the control unit 14 determines whether or not as many settlements as the number of ordering persons have all been completed (that is, whether or not as many payments as the number of ordering persons have all been authorized) (step S35). In a case where it is determined that as many settlements as the number of ordering persons have all been completed (step S35: YES), as described above, the order information is transmitted to the center server 2 by the communication unit 11 via the communication network NW (step S36), and the processing ends. On the other hand, in a case where it is determined that as many settlements as the number of ordering persons have not been completed (step S35: NO), the processing returns to step S31.

Subsequently, in the center server 2, order processing (1) illustrated in FIG. 18A is started when the order is received by the center server 2 receiving the order information from the order reception & processing terminal 1. When order processing (1) illustrated in FIG. 18A is started, the control unit 23 causes the order reception & processing unit 23*b* to issue the identifier of the order (step S101).

Subsequently, the control unit 23 causes the order reception & processing unit 23*b* to register the order reception date and time, the order type, the identifier and the quantity of each of the items, and the positional information of the delivery destination in the order management database 224 in association with the identifier of the order (step S102). Subsequently, the control unit 23 causes the order reception & processing unit 23*b* to register the identifier of the order, the order reception date and time, the order type, and the delivery preparation start flag “0” in the delivery preparation task table in association with each other (step S103), and ends the processing. Incidentally, the processing illustrated in FIG. 18A is similarly executed in Examples 2 and 3 described below.

On the other hand, order processing (2) illustrated in FIG. 18B is started, for example, in a case where the delivery plan of the one or more items related to the order with the delivery preparation start flag of “0” in the delivery preparation task table is determined. When order processing (2) illustrated in FIG. 18B is started, the control unit 23 selects an order (order with the delivery preparation start flag of “0”) next to the order for which the delivery plan has been determined (step S105).

Subsequently, as described above, the control unit 23 causes the order reception & processing unit 23*b* to determine the delivery plan of the one or more items related to the order selected in step S105 (step S106). Subsequently, the control unit 23 causes the order reception & processing unit 23*b* to register the information regarding the delivery plan determined in step S106 in the order management database 224 in association with the identifier of the order (step S107).

Subsequently, as described above, the control unit 23 transmits, from the delivery preparation command unit 23*c*, the delivery preparation command information including the information regarding the delivery plan determined in step S106, the identifiers, the names, the quantities, and the delivery destination of the one or more items related to the order to, for example, the mobile terminal of the staff existing in the item storage base via the communication network NW by the communication unit 21 (step S108), and ends the processing. Incidentally, the processing illustrated in FIG. 18B is similarly executed in Examples 2 and 3 described below.

Example 2

Next, the operation of the order processing system S in Example 2 will be described. Example 2 is an example of a case where the item selection and the item sorting instruction are performed at the same time using the item selection & sorting screen (FIG. 7). Incidentally, the processing in steps S41 to S43 illustrated in FIG. 19 is similar to the processing in steps S1 to S3 illustrated in FIG. 15.

In step S44, the control unit 14 determines whether or not a transition instruction to the item selection & sorting screen has been received (a transition instruction to the item selection & sorting screen has been issued).

For example, when the "TO ITEM SELECTION" button 53 illustrated in FIG. 4 is pressed, the transition instruction to the item selection & sorting screen is received by the user instruction reception unit 14*b*.

Then, in a case where it is determined that the transition instruction to the item selection & sorting screen has been received (step S44: YES), the processing proceeds to step S45. On the other hand, in a case where it is determined that the transition instruction to the item selection & sorting screen has not been received (step S44: NO), the processing returns to step S42. Incidentally, in a case where it is determined that the transition instruction to the item selection & sorting screen has not been received, for example, in a case where a "RETURN TO PREVIOUS SCREEN" button 86 illustrated in FIG. 7 is designated, the number-of-ordering-persons designation screen is displayed again.

In step S45, the control unit 14 causes the screen display control unit 14*a* to display the item selection & sorting screen as illustrated in FIG. 7 on the display. At this time, as described above, the display processing unit 14*c* may display the information regarding the item (for example, the recommended item) serving as the selection option in the selection option item display area 82. Incidentally, the processing in steps S46 to S49 illustrated in FIG. 19 is similar to the processing in steps S6 to S9 illustrated in FIG. 15.

In step S50, the control unit 14 determines whether or not the item selection and sorting instruction has been received (the item selection & sorting instruction has been issued). For example, when the photographic image or the like of the item in the selection option item display area 82 illustrated in FIG. 7 is dragged and dropped to any one or more of the selected & sorted item display areas 83*a* to 83*c*, the item selection and sorting instruction is received.

Then, in a case where it is determined that the item selection and sorting instruction has been received (step S50: YES), the item instructed to be selected and sorted is sorted to any one of the users by the sorting processing unit 14*d*, and information regarding the selected and sorted one or more items is displayed in any one or more of the selected & sorted item display areas 83*a* to 83*c* by the display processing unit 14*c* (step S51), and the processing proceeds to step S52. On the other hand, in a case where it is determined that the item selection and sorting instruction has not been received (step S50: NO), the processing proceeds to step S52.

In step S52, the control unit 14 determines whether or not a transition instruction to the order content confirmation screen has been received (a transition instruction to the order content confirmation screen has been issued). For example, when the "TO ORDER CONTENT CONFIRMATION" button 85 illustrated in FIG. 7 is pressed, the transition instruction to the order content confirmation screen is received by the user instruction reception unit 14*b*. Incidentally, in a case where each of the one or more items instructed to be selected and sorted is not sorted into any of as many users as the number of ordering persons (in other words, in a case where the information regarding the one or more items instructed to be selected and sorted is not displayed in any of the selected & sorted item display areas 83*a* to 83*c*), the "TO ORDER CONTENT CONFIRMATION" button 85 cannot be pressed.

Then, in a case where it is determined that the transition instruction to the order content confirmation screen has been received (step S52: YES), order processing (2) illustrated in FIG. 16 is executed, and then order processing (3) illustrated in FIG. 17 is executed, as in Example 1. On the other hand, in a case where it is determined that the transition instruction to the order content confirmation screen has not been received (step S52: NO), the processing returns to step S46. Incidentally, in a case where it is determined that the transition instruction to the order content confirmation screen has not been received, for example, in a case where the "RETURN TO PREVIOUS SCREEN" button 86 illustrated in FIG. 7 is designated, the number-of-ordering-persons designation screen is displayed again.

Example 3

Next, the operation of the order processing system S in Example 3 will be described. Example 3 is an example of a case where sorting is performed simultaneously with item selection for each of the users by using the dedicated screens (FIGS. 10 to 12) of the plurality of users in the group. Incidentally, the processing in steps S61 to S64 illustrated in FIG. 20 is similar to the processing in steps S1 to S4 illustrated in FIG. 15.

In step S65, the control unit 14 causes the screen display control unit 14*a* to display the item selection screen as illustrated in FIG. 10 on the display. At this time, as described above, the display processing unit 14*c* may display the information regarding the item (for example, the recommended item) serving as the selection option in the selection option item display area 112. Incidentally, the processing in steps S66 to S69 illustrated in FIG. 20 is similar to the processing in steps S6 to S9 illustrated in FIG. 15.

In step S70, the control unit 14 determines whether or not the item selection has been received (the item selection has been performed). For example, when the photographic image or the like of the item in the selection option item display area 112 is dragged and dropped to the selected item display area 113, the item selection is received. In a case where it is determined that the item selection has been received (step S70: YES), the display processing unit 14*c* displays the information regarding the selected item in the selected item display area 113 (step S71), and the processing proceeds to step S72. On the other hand, in a case where it is determined that the item selection has not been received (step S70: NO), the processing proceeds to step S72.

In step S72, the control unit 14 determines whether or not a transition instruction to the subsequent dedicated screen has been received (a transition instruction to the subsequent dedicated screen has been issued). For example, when the "NEXT" button 115 illustrated in FIG. 10 is pressed, the transition instruction to the subsequent dedicated screen is received by the user instruction reception unit 14*b*.

Then, in a case where it is determined that the transition instruction to the subsequent dedicated screen has been received (step S72: YES), the processing proceeds to step S73. On the other hand, in a case where it is determined that the transition instruction to the subsequent dedicated screen has not been received (step S72: NO), the processing returns to step S66. Incidentally, in a case where it is determined that the transition instruction to the subsequent dedicated screen has not been received, for example, in a case where a "RETURN TO PREVIOUS SCREEN" button 116 illustrated in FIG. 10 is designated, the number-of-ordering-persons designation screen is displayed again.

In step S73, the control unit 14 determines whether or not as many item selection screens as the number of ordering persons have been displayed (that is, whether or not the item selection by each of as many users as the number of ordering persons has been received). In a case where it is determined that as many item selection screens as the number of ordering persons have not been displayed (step S73: NO), the processing returns to step S65, and the item selection screen of the subsequent user is displayed on the display. On the other hand, in a case where it is determined that as many item selection screens as the number of ordering persons have been displayed (step S73: YES), the processing proceeds to order processing (2) illustrated in FIG. 21.

When order processing (2) illustrated in FIG. 21 is started, in step S74, the control unit 14 causes the screen display control unit 14*a* to display the order content confirmation screen as illustrated in FIG. 11 on the display, and causes the display processing unit 14*c* to display information regarding the one or more items sorted for the current user (for example, the user a) in the order content confirmation area 121 as described above.

In step S75, control unit 14 causes the weight/volume calculation unit 14*e* to calculate the total order weight value as described above. Subsequently, the control unit 14 determines whether or not the total order weight value exceeds the mountable weight upper limit value for the delivery vehicle (step S76). In a case where it is determined that the total order weight value exceeds the mountable weight upper limit value for the delivery vehicle (step S76: YES), the processing proceeds to step S77. On the other hand, in a case where it is determined that the total order weight value does not exceed the mountable weight upper limit value for the delivery vehicle (step S76: NO), the processing proceeds to step S79.

In step S77, the control unit 14 determines whether or not the total weight of the one or more items sorted for the user (current user) on the currently displayed order content confirmation screen is the highest. In a case where it is determined that the total weight of the one or more items sorted for the current user is the largest (step S77: YES), the alert is displayed for the current user (step S78), and the processing proceeds to step S83. On the other hand, in a case where it is determined that the total weight of the one or more items sorted for the current user is not the largest (step S77: NO), the processing proceeds to step S79.

In step S79, as described above, the control unit 14 causes the weight/volume calculation unit 14*e* to calculate the total order volume value. Subsequently, the control unit 14 determines whether or not the total order volume value exceeds the mountable volume upper limit value for the delivery vehicle (step S80). In a case where it is determined that the total order volume value exceeds the mountable volume upper limit value for the delivery vehicle (step S80: YES), the processing proceeds to step S81. On the other hand, in a case where it is determined that the total order volume value does not exceed the mountable volume upper limit value for the delivery vehicle (step S80: NO), the processing proceeds to step S85.

In step S81, the control unit 14 determines whether or not the total volume of the one or more items sorted for the user (current user) on the currently displayed order content confirmation screen is the largest. In a case where it is determined that the total volume of the one or more items sorted to (current user) is the highest (step S81: YES), the alert is displayed for the current user (step S82), and the processing proceeds to step S83. In a case where it is determined that the total volume of the one or more items sorted for the current user is not the highest (step S81: NO), the processing proceeds to step S85.

In step S83, the control unit 14 determines whether or not the item selection cancellation instruction has been received (the selection cancellation instruction has been issued). In a case where it is determined that the item selection cancellation instruction is received (step S83: YES), the selection of the item is canceled (step S84). Then, the information regarding the item is deleted from the order content confirmation area 121, and the processing returns to step S75. On the other hand, in a case where the item selection cancellation instruction is not received (step S83: NO), reception of the item selection cancellation instruction is awaited.

In step S85, the control unit 14 receives the item delivery timing selection and advances the processing to step S86. Incidentally, the item delivery timing selection only needs to be performed by any one of the plurality of users in the group. Thus, in a case where the delivery timing is already selected and received by the user instruction reception unit 14*b*, the processing in step S85 is skipped, and the processing proceeds to step S86.

In step S86, the control unit 14 determines whether or not a transition instruction to the settlement screen (order content confirmation instruction) has been received (a transition instruction to the settlement screen has been issued). For example, when a "TO ORDER" button 124 illustrated in FIG. 11 is pressed, the transition instruction to the settlement screen is received by the user instruction reception unit 14*b*.

Then, in a case where it is determined that the transition instruction to the settlement screen has been received (step S86: YES), the processing proceeds to order processing (3) illustrated in FIG. 22. On the other hand, in a case where it is determined that the transition instruction to the settlement screen has not been received (step S86: NO), the processing returns to step S86. Incidentally, in a case where it is determined that the transition instruction to the settlement screen has not been received, for example, in a case where a "RETURN TO PREVIOUS SCREEN" button 125 illustrated in FIG. 11 is designated, the item selection screen is displayed again.

When order processing (3) illustrated in FIG. 22 is started, in step S87, the control unit 14 causes the screen display control unit 14*a* to display the settlement screen as illustrated in FIG. 12 on the display. Subsequently, the control unit 14 calculates a payment amount related to the order of the one or more items sorted for the current user (for example, the user a) (step S88). In calculating the payment amount, the delivery fee allocation unit 14*f* calculates the delivery fee for each of the users in the group as described above, and allocates the calculated delivery fee to each of the users. Such allocation may be performed only when the first settlement screen is being displayed.

Subsequently, as described above, the control unit 14 causes the display processing unit 14*c* to display the information (including the calculated payment amount) regarding the settlement of the one or more items related to the order in the payment amount confirmation area 131 (step S89). Subsequently, the control unit 14 receives the settlement method selection (step S90). For example, when any one of the “CREDIT CARD SETTLEMENT” button 1321, the “ELECTRONIC MONEY SETTLEMENT” button 1322, and the “CASH SETTLEMENT” button 1323 in the settlement method selection areas 132 illustrated in FIG. 12 is pressed, the settlement method selection is received by the user instruction reception unit 14*b*.

Subsequently, as in Example 1, the control unit 14 causes the screen display control unit 14*a* to display a screen corresponding to the selected settlement method on the display (step S91). Subsequently, the control unit 14 determines whether or not the settlement instruction of the one or more items related to the order has been received (the settlement instruction has been issued) (step S92). In a case where it is determined that the settlement instruction of the one or more items related to the order has been received (step S92: YES), the processing proceeds to step S93. On the other hand, in a case where it is determined that the settlement instruction of the one or more items related to the order has not been received (step S92: NO), reception of the settlement instruction is awaited.

In step S93, on the basis of the payment amount related to the order of the user who has given the received settlement instruction, the control unit 14 performs the settlement processing of performing settlement for the one or more items sorted for the user by the settlement processing unit 14*g* as described above. In such settlement processing, the payment is authorized or not authorized.

Subsequently, the control unit 14 determines whether or not the settlement has been completed in step S93 (that is, whether or not the payment has been authorized) (step S94). In a case where it is determined that the settlement has been completed (step S94: YES), the processing proceeds to step S95. On the other hand, in a case where it is determined that the settlement has not been completed (step S94: NO), an error prompting redo is displayed, and the processing returns to step S90.

In step S95, the control unit 14 determines whether or not as many order content confirmation screens as the number of ordering persons have been displayed. In a case where it is determined that as many order content confirmation screens as the number of ordering persons have not been displayed (step S95: NO), the processing returns to step S74 illustrated in FIG. 21, and the order content confirmation screen for the subsequent user is displayed on the display. On the other hand, in a case where it is determined that as many order content confirmation screens as the number of ordering persons have been displayed (step S95: YES), the order information is transmitted to the center server 2 by the communication unit 11 via the communication network NW (step S96) as in Example 1, and the processing ends.

Incidentally, in the example in FIGS. 21 and 22, the order content confirmation screen and the settlement screen are sequentially displayed for each of the users. However, for example, the order content confirmation screen of the user b may be displayed immediately after the order content confirmation screen of the user a is displayed. In this case, after the order content confirmation screens of all the users are displayed, the settlement screens of the respective users are sequentially displayed.

As described above, according to the above embodiment, the order processing system S receives the designation of the number of ordering users related to the group order, receives the selection of items related to the order, and sorts and settles the selected items for each of as many users as the designated number of ordering users. Therefore, in a case where a plurality of users simultaneously orders items, it is possible for the respective users to easily grasp the payment amount related to the order and easily make payment.

Incidentally, the above-described embodiment is one embodiment of the present invention, and the present invention is not limited to the above-described embodiment, changes from the above-described embodiment can be made on various configurations and the like within a scope not departing from the gist of the present invention, and such cases shall be also included in the technical scope of the present invention. In the order processing system S according to the above embodiment, one order reception & processing terminal 1 is installed at one installation place, but the present invention is not limited thereto, and a plurality of order reception & processing terminals 1 may be installed at one installation place, the plurality of order reception & processing terminals 1 may receive one group order, and the plurality of order reception & processing terminals 1 may cooperate and process the group order while synchronizing. For example, the settlement screen of the user a may be displayed on one order reception & processing terminal 1 of the plurality of order reception & processing terminals 1, and the settlement screen of the user b may be displayed on another order reception & processing terminal 1 of the plurality of order reception & processing terminals 1. Moreover, in the above embodiment, the delivery vehicle such as the UAV and the UGV has been described as an example of the movable body, but the present invention is not limited thereto, and the movable body may be a bicycle (that is, including delivery by bicycle) or a person.

REFERENCE SIGNS LIST

1 Order reception & processing terminal
2 Center server
11 Communication unit
12 Operation/display unit
13 Storage unit
14 Control unit
14*a* Screen display control unit
14*b* User instruction reception unit
14*c* Display processing unit
14*d* Sorting processing unit
14*e* Weight/volume calculation unit
14*f* Delivery fee allocation unit
14*g* Settlement processing unit
21 Communication unit
22 Storage unit
23 Control unit
23*a* Item search unit
23*b* Order reception & processing unit
23*c* Delivery preparation command unit
S Order processing system

What is claimed is:

1. An order processing system configured to receive a collective order for a plurality of users regarding one or more items to be delivered by a movable body, the order processing system comprising:

at least one memory configured to store program code; and at least one processor configured to access the program code and operate as instructed by the program code, the program code comprising:

first reception code configured to cause at least one of the at least one processor to receive information identifying the plurality of users for the collective order;

second reception code configured to cause at least one of the at least one processor to receive selection information corresponding to the one or more items; and processing code configured to cause at least one of the at least one processor to:

associate, based on the selection information, the one or more items with one or more of the plurality of users, and to perform payment processing for each user in accordance with the items associated with the user;

display, based on a total weight of the one or more items of the plurality of users exceeding a per-delivery weight that can be carried by the movable body, an alert for a first user having the highest total weight of items associated with the first user, from among the plurality of users; and based on the total weight not exceeding the per-delivery weight, control the movable body to deliver the one or more items.

2. The order processing system according to claim 1, wherein the processing code is further configured to cause at least one of the at least one processor to perform payment processing for the items associated with the plurality of users based on payment amounts for each of the plurality of users.

3. The order processing system according to claim 2, wherein a payment amount for one of the plurality of users comprises a price of the items associated with the one user and a delivery fee allocated to the one user.

4. The order processing system according to claim 3, wherein the program code further comprises allocation code configured to cause at least one of the at least one processor to allocate delivery fees among the plurality of users based on the items associated with each of the plurality of users.

5. The order processing system according to claim 4, wherein the allocation code is configured to cause at least one of the at least one processor to allocate the delivery fees among the plurality of users such that a user having a higher total price of items associated with the user is allocated a higher delivery fee than the other users.

6. The order processing system according to claim 4, wherein the allocation code is configured to cause at least one of the at least one processor to allocate delivery fees among the plurality of users such that a user having a larger quantity of items associated with the user is allocated a higher delivery fee than the other users.

7. The order processing system according to claim 4, wherein the allocation code is configured to cause the at least one processor to:

allocate a smaller portion of the delivery fees to a first user whose total weight of items associated with the first user does not exceed a per-user weight threshold; and allocate a greater portion of the delivery fees to a second user whose total weight of items associated with the second user exceed the per-user weight threshold.

8. The order processing system according to claim 4, wherein the allocation code is configured to cause at least one of the at least one processor to:

allocate a smaller portion of the delivery fees to a first user whose total volume of items associated with the first user does not exceed a per-user volume threshold; and allocate a greater portion of the delivery fees to a second user whose total volume of items associated with the second user exceed the per-user volume threshold.

9. The order processing system according to claim 1, wherein the at least one memory and the at least one processor are included in a server connected to a communication network, and wherein the program code further comprises:

fifth reception code configured to cause at least one of the at least one processor to receive, via the communication network, a first order that is transmitted from a first terminal, wherein the first terminal is configured to receive (i) the information identifying the plurality of users and (ii) the selection information, and wherein the first order indicates a delivery destination for the one or more items that is at a same location or within a vicinity of the first terminal, sixth reception code configured to cause at least one of the at least one processor to receive, via the communication network, a second order that is transmitted from a second terminal by a user other than the plurality of users, wherein the second order indicates a delivery destination at a same location as the second terminal, and determination code configured to cause at least one of the at least one processor to generate a delivery plan such that delivery of the first order is prioritized over delivery of the second order.

10. The order processing system according to claim 9, wherein the determination code is configured to cause at least one of the at least one processor to:

identify the movable body from among a plurality of movable bodies;

set a scheduled delivery start time and a scheduled delivery end time of the movable body; and control, at the scheduled delivery start time, the movable body to deliver, within the scheduled delivery end time, the one or more items of the first order to the delivery destination identified in the first order.

11. The order processing system according to claim 1, wherein the processing code is configured to cause at least one of the at least one processor to display, based on a total weight of the one or more items of the plurality of users exceeding a per-delivery weight that can be carried by the movable body, an alert for a first user having the highest total weight of items associated with the first user, from among the plurality of users.

12. The order processing system according to claim 11, wherein the program code further comprises seventh reception code configured to cause at least one of the at least one processor to receive information indicating a selection of items, from among the items associated with the first user to be canceled, and wherein the processing code is configured to cause at least one of the at least one processor to cancel the selected items from among the items associated with the first user.

13. The order processing system according to claim 1, wherein the program code further comprises third reception code configured to cause at least one of the at least one processor to receive sorting information for the one or more items, and wherein the processing code is configured to cause at least one of the at least one processor to, associate, based on the sorting information, the one or more items with one or more of the plurality of users.

14. The order processing system according to claim 1, wherein the processing code is further configured to cause at least one of the at least one processor to display one or more order screens corresponding to the plurality of users, wherein the program code further comprises fourth reception code configured to cause at least one of the at least one processor to receive order information input through the one or more order screens, and wherein the processing code is further configured to cause at least one of the at least one processor to perform payment processing, based on the order information, for the items associated with the plurality of users.

15. The order processing system according to claim 1, wherein the processing code is configured to cause at least one of the at least one processor to display information indicating whether the items associated with each of the plurality of users exceed a per-user weight threshold or a per-user volume threshold.

16. The order processing system according to claim 1, wherein the processing code is configured to cause at least one of the at least one processor to display at least one of a total weight or a total volume of the one or more items associated with each of the plurality of users.

17. The order processing system according to claim 1, wherein the processing code is configured to cause at least one of the at least one processor to display for each of the plurality of users, at least one of:

a per-user weight threshold and a total weight of the items associated with the user; or a per-user volume threshold and a total volume of the items associated with the user.

18. The order processing system according to claim 1, wherein the one or more items of the plurality of users comprise a set of items in which a plurality of items are grouped together, and wherein the second reception code is configured to cause at least one of the at least one processor to:

receive information indicating a selection of one or more items, from among the set of items, as a selection of items for a first user from among the plurality of users; and receive information indicating a selection of the remaining items, from among the set of items, as a selection of items for a second user from among the plurality of users.

19. An order reception terminal configured to receive a collective order for a plurality of users regarding one or more items to be delivered by a movable body, the order reception terminal comprising:

at least one memory configured to store program code; and at least one processor configured to access the program code and operate as instructed by the program code, the program code comprising:

first reception code configured to cause at least one of the at least one processor to receive information identifying the plurality of users for the collective order;

second reception code configured to cause at least one of the at least one processor to receive selection information corresponding to the one or more items; and processing code configured to cause at least one of the at least one processor to:

associate, based on the selection information, the one or more items with one or more of the plurality of users, and to perform payment processing for each user in accordance with the items associated with the user;

display, based on a total weight of the one or more items of the plurality of users exceeding a per-delivery weight that can be carried by the movable body, an alert for a first user having the highest total weight of items associated with the first user, from among the plurality of users; and based on the total weight not exceeding the per-delivery weight, control the movable body to deliver the one or more items.

* * * * *